(12) United States Patent
Cui et al.

(10) Patent No.: US 6,888,938 B2
(45) Date of Patent: May 3, 2005

(54) DYNAMICALLY ADJUSTABLE DIGITAL GYRATOR HAVING EXTENDABLE FEEDBACK FOR STABLE DC LOAD LINE

(75) Inventors: Hong Cui, Morganville, NJ (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 565 days.

(21) Appl. No.: 09/884,040

(22) Filed: Jun. 20, 2001

(65) Prior Publication Data

US 2003/0026418 A1 Feb. 6, 2003

Related U.S. Application Data

(63) Continuation of application No. 09/310,021, filed on May 11, 1999, now Pat. No. 6,665,403.

(51) Int. Cl.[7] .............................................. H04M 1/00
(52) U.S. Cl. ........................... 379/390.02; 379/413.02; 379/413.03; 379/413.04
(58) Field of Search ....................... 379/387.01, 387.02, 379/390.02, 399.01, 399.02, 402, 403

(56) References Cited

U.S. PATENT DOCUMENTS

| | | | | | |
|---|---|---|---|---|---|
| 5,144,287 | A | * | 9/1992 | Remson | 340/664 |
| 5,880,538 | A | * | 3/1999 | Schulz | 307/109 |
| 6,194,972 | B1 | * | 2/2001 | Brown | 331/108 B |
| 6,212,274 | B1 | * | 4/2001 | Ninh | 379/413 |
| 6,335,656 | B1 | * | 1/2002 | Goldfarb et al. | 327/559 |
| 6,577,212 | B1 | * | 6/2003 | Mattisson et al. | 333/215 |
| 6,611,580 | B1 | * | 8/2003 | Dahan et al. | 379/93.29 |
| 6,618,482 | B2 | * | 9/2003 | Parrott | 379/412 |
| 6,693,916 | B1 | * | 2/2004 | Chaplik et al. | 370/485 |

* cited by examiner

Primary Examiner—Curtis Kuntz
Assistant Examiner—Tuan Pham

(57) ABSTRACT

A dynamically adjustable digital gyrator device for a telephone line interface (e.g., a DAA) utilizing extended feedback and a dynamically adjustable filter to achieve stable convergence in the control of DC line current on a telephone line a short period of time. The low pass filter of the digital gyrator includes at least two (2) different fast filter settings and at least two (2) different slow filter settings based on possible load terminations (e.g., PBX, TAS, etc.), which can be determined based on the dynamic detection of an oscillation on the line. For instance, in a disclosed example, a voice band modem system is allowed to go off-hook with a 1 Hz cutoff low pass filter, and then the output of the low pass filter is checked for an oscillation. If an oscillation is detected, then the poles and/or zeroes of the low pass filter cutoff are changed to a slower convergence rate cutoff frequency (e.g., to 0.1 Hz). As a result, the exemplary voice band modem will converge stably and quickly (e.g., in less than 1 second) before dialing begins. By controlling the DC line current digitally, software can be used to set the DC line current in accordance with predefined characteristics. Predefined characteristics can be set to accommodate varying country specifications instead of using switches to control resistors and capacitors.

22 Claims, 24 Drawing Sheets

DYNAMICALLY ADJUSTABLE DIGITAL GYRATOR HAVING EXTENDED FEEDBACK

DYNAMICALLY ADJUSTABLE DIGITAL GYRATOR HAVING EXTENDED FEEDBACK

DYNAMICALLY ADJUSTABLE DIGITAL GYRATOR EXAMPLE

CODEC and Telephone System Stability Block Diagram

Simplified D/A Path

DSP Based Gyrator Block Diagram

10 Hz Fast DC Loop Filter Gain and Phase

First Order Filter Topology

Final Low Pass Topology with glitch removed

DC Loop Filter Without Hysterysis

DC Loop Filter With Hysterysis

TAS, PBX and Real Phone Line V/I Loadlines

TAS Termination with Lowpass Filter Cutoff = .1 Hz

DYNAMICALLY ADJUSTABLE DIGITAL GYRATOR HAVING EXTENDABLE FEEDBACK FOR STABLE DC LOAD LINE

This is a continuation of Ser. No. 09/310,021 filed on May 11, 1999 now U.S. Pat. No. 6,665,403.

BACKGROUND OF THE INVENTION

1. Field of the Invention

This invention relates generally to a DAA interface (e.g., a Data Access Arrangement for a modem, telephone answering device, etc.) More particularly, it relates to a digital gyrator method and apparatus which emulates an inductor value of a telephone line interface on a telephone line in a stable manner after going into an off-hook condition.

2. Background of Related Art

Telephone systems in countries throughout the world have unique system requirements that need to be followed in order to legally sell and use telecommunication devices within their respective borders. One of the commonly known system requirements mandates that when a telephone line goes off-hook (i.e., when the telephone line is in use), the DC current level on the line must reach a certain level within a specified period of time and maintain that level until the call is completed. The DC current level, on the line must stay at a certain level in order to be interpreted by the telephone system as an active line throughout the duration of the telephone call. The current rise time and maximum current level are also regulated to prevent damage to telecommunication equipment.

In order to hold a telephone line in the off-hook condition, a specified level of current must be drawn which relates to the voltage level on the line and conforms to a country's telecommunication requirements. The desired operating current is generally expressed on a graph of current-versus-voltage known in the art as a load-line. The load-line represents a level of resistance for voltages on a current-versus-voltage graph, allowing a level of current to be determined for a given voltage.

FIG. 15 is an example of a current-versus-voltage load-line requirement to keep a telephone line in an off-hook condition. The slope of the load-line on a current-versus-voltage graph is the inverse of the line resistance. Telephone systems develop a voltage which is a potential impressed on the telephone line between two terminals, commonly known as the tip and ring voltage. As seen in FIG. 15, the desired level of current to keep a telephone line in the off-hook condition can be achieved for a given voltage by setting an appropriate line resistance. The template illustrated in FIG. 15 is representative of the parameters set forth by a country and varies from country to country. The parameters can even change within a country due to changes in a country's requirements (e.g., if a country updates their telecommunication system).

One method that has been used to set the DC line current on a telephone line when the telephone line goes off-hook is to place an inductor in series with a resistor across a telephone line connection and then couple the voice circuits to the line through a capacitor.

FIG. 16 shows a conventional circuit for setting DC line current.

In particular, as shown in FIG. 16, a commonly known prior art circuit for setting DC line current comprises resistance $R_{DC}$, capacitance C and inductance L. Since inductors appear as shorts to DC current and as high impedance to AC current, the AC current is filtered out leaving just the DC current on the telephone line. The DC current can be set by choosing an appropriate value for the resistance $R_{DC}$, dependent on the particular DC current level required. The circuit of FIG. 16 is less than optimal because of the inherently bulky nature and high cost of the inductor L, the amount of time for inductor L to charge, and the need to change circuit elements in countries with different off-hook current level requirements.

Voice band modems must present the same electrical characteristics to a telephone line as a standard telephone to meet international requirements allowing attachment of the voice band modem to the telephone line. One conventional approach that has been used to control the DC line current in a telephone system such as a voice band modem replaces the inductor L of FIG. 16 with additional system components that are smaller and less expensive to emulate the large inductor used in older telephone sets to set the loop DC resistance independent of the voice band impedance.

FIG. 17 shows a conventional gyrator circuit.

As shown in FIG. 17, such an arrangement of components can be used to control DC line current and is commonly known in the industry as a gyrator. A gyrator is a circuit used in a modem to set the DC termination while not disturbing the AC signals for transmit and receive. A gyrator allows a voice band modem to be reduced in cost and size, while still meeting the signal linearity needs of V.90 and V.34 voice band modems.

The conventional gyrator depicted in FIG. 17 functions like a large inductor across the telephone line and can be used in place of the conventional discrete component circuit shown in FIG. 16. The conventional gyrator is implemented with many discrete components such as transistors, resistors, capacitors, and digitally controlled switches located close to the tip and ring of the telephone line interface. As shown in FIG. 17, the conventional gyrator contains digitally controlled switches $DCS_C$ and $DCS_R$ used to switch different levels of capacitance and resistance into the gyrator circuit, respectively. By switching different levels of capacitance and resistance into the circuit, the time constant of the circuit can be changed, such that the transistors can be manipulated to provide the correct level of current on the telephone line within a specified period of time. The circuit allows different start up transient times and DC current levels to be adjusted in accordance with a user's specifications using a single circuit. The $DCS_C$ switches affect initial transient settling time and the $DCS_R$ switches affect the DC load-line. However, the adjustability of the circuit is set when the circuit is manufactured, limited by the physical components used in the circuit. If the specifications change after manufacture, in order to change the device, components need to be physically changed within the device or an entirely new device needs to be installed.

FIG. 18A depicts another V/I load line, and FIG. 18B shows a basic gyrator design which is implemented with external circuitry.

As shown in FIG. 18B, the gyrator appears as 400 ohms at DC and a large impedance for any voice band modem signal from 50 Hz to 4 kHz. The gyrator uses transistors and small capacitors to emulate the large inductor shown in FIG. 18B in a much smaller size and cost than the physical inductor. For the example shown in FIG. 18B, inductors are used to simplify the schematic. In the example, the DC voltage across the modem VTIP is set by the DC current flowing through resistor RP. The transfer function from VCO to VRP is as follows:

$$\frac{VRP(f)}{VCO(f)} =$$

$$H(f) = \frac{RP}{RCO + s \times LS + RP} = \frac{RP}{(RP + RCO)} \times \frac{1}{1 + s \times \frac{LS}{RP + RCO}}$$

$$Fc = \frac{RP + RCO}{2 \times \pi \times LS} = 3.71 \text{ Hz}$$

This accomplishes the task of separating the AC and DC terminations. The low corner frequency is needed to minimize degradation of the modem signal by the gyrator. This low corner frequency comes at the price of slow settling time. Solving the differential equation for VCO(t) in terms of VRP(t), the voltage across the 400 Ohm resistor, yields the time constant τ. To simplify the analysis, the loading of CAC is ignored. The time constant τ is equal to the coefficient of the first derivative.

$$VCO(t) = RCO \times ICO(t) + LS \times ICO(t) + RP \times ICO(t)$$

$$VRP(t) = RP \times ICO(t)$$

$$VLS(t) = LS \times \frac{dICO}{dt}$$

$$ICO(t) = \frac{VRP(t)}{RP}$$

$$VCO(t) = \frac{(RP + RCO)}{RP} \times \left(\frac{LS}{(RP + RCO)} \times \frac{dVRP}{dt} + VRP(t)\right)$$

$$\tau = \frac{LS}{(RP + RCO)} = \frac{60}{1400} = 42.9 \text{ ms}$$

It typically takes five time constants for the circuit to converge to 1% of its steady state value. For the example in FIG. 18B, it will take 214 ms for VP to reach 14.27 volts after going off-hook. Most countries require that the current ICO be above a certain level in a short period of time after going off-hook. For example, in CTR21 countries the current must have settled within 20 ms after going off-hook. During this startup time period, AC transmit and receive modem signals have not yet started. This allows the gyrator cutoff frequency to be extended to higher frequencies at startup. One way to do this is shown in FIG. 18B where a smaller inductor LF is switched in at startup by closing S1 and opening S2. Once steady state has been achieved, the larger inductor LS is switched in by closing S2 and opening S1. The example cutoff frequency Fc and five r at startup are as follows:

$$Fc = \frac{RP + RCO}{2 \times \pi \times LF} = 74.3 \text{ Hz}$$

$$5 \times \tau = 5 \times \frac{LF}{(RP + RCO)} = \frac{5 \times 3}{1400} = 10.7 \text{ ms}$$

Thus, conventional DC current levels are set using external components on a country by country basis, resulting in an expensive and inflexible solution.

DC current levels can be set in a digital device such as a gyrator. In a gyrator, a filter operates at the sample rate of the digital device (e.g., at the modem rate). However, the digital transport delay between a digital signal processor (DSP) and its host processor will vary, e.g., because of bus delay, etc. The other device may not give up the bus for 25 mS or more. These transport delays may introduce enough phase delay such that it may not be possible to find one lowpass filter cutoff frequency to make the gyrator stable on all possible central office line terminations. If the gyrator is not stable, the modem will not be able to establish a connection.

There is a need for an improved circuit and method to emulate an inductor in a telephone line interface with a gyrator which will operate with stability quickly and under various country installation conditions and requirements.

SUMMARY OF THE INVENTION

In accordance with the principles of the present invention, a digital gyrator comprises a digital filter to emulate an inductance on a telephone line serviced by the digital filter, the digital filter being initially settable to a first cutoff frequency. An oscillation checker module checks for a significant oscillation on the telephone line serviced by the digital filter including the digital filter set to the first cutoff frequency. The oscillation checker module resets the digital filter to a second cutoff frequency lower than the first cutoff frequency if a significant oscillation is detected by the oscillation checker module.

A method of regulating a signal on a telephone line in accordance with another aspect of the present invention comprises digitizing a signal received from the telephone line. The digitized signal is filtered with a digital low pass filter having a first cutoff frequency. An oscillation in the signal at the telephone line is detected. If an oscillation is detected, the digital low pass filter is adjusted to have a second cutoff frequency lower than the first order cutoff frequency to dampen the detected oscillation.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

One example of a digital gyrator forming a basis for the present invention is described in U.S. applicaton Ser. No. 09/310,021, entitled "Digital Gyrator" filed May 11, 1999 by Jonathan H. Fischer, Donald R. Laturell, and Lane A. Smith, the entirety of which is expressly incorporated herein by reference.

The present invention relates to the implementation of a dynamically adjustable digital gyrator for a telephone line interface (e.g., a DAA) to emulate the large inductor typically seen in conventional telephone sets. In accordance with the principles of the present invention, the large inductor is emulated by a low pass filter having adjustable cutoff frequencies which are changed according to whether or not an off-hook oscillation is detected. The low pass filter preferably operates at the modem sample rate.

The digital transport delay (i.e., a delay from a digital signal processor (DSP) to a processor on the modem's host device) varies from system to system. In some cases, the digital transport delay can be as long as 25 ms, and may introduce enough phase delay that it is not possible to find a single low pass filter cutoff frequency which makes the gyrator stable on all possible central office line terminations. If the gyrator is not stable, the modem may not be able to establish a connection quickly enough, or even at all.

The present invention provides a method and apparatus for automatically determining if a digital gyrator is stable, and if the digital gyrator is not stable, the invention provides for a method and apparatus for dynamically adjusting the emulated inductor value to achieve stability. Thus, a low pass filter in accordance with the present invention includes at least one (1) fast filter setting and at least two (2) different slow filter settings based on the particular load termination, and the particular load termination can be determined dynamically based on the occurrence of an oscillation.

In accordance with the principles of the present invention, a communication system (e.g., modem) is allowed to go off-hook with a first level cutoff low pass filter, e.g., with a 1 Hz cutoff low pass filter, and the output of the low pass filter is then checked for an oscillation. If an oscillation is detected, the low pass filter cutoff is changed to a slower convergence rate, e.g., to have a 0.1 Hz cutoff low pass filter.

As a result, the telephone system will converge with stability in a short period of time, e.g., in less than 1 second before dialing begins.

Figure 1A:
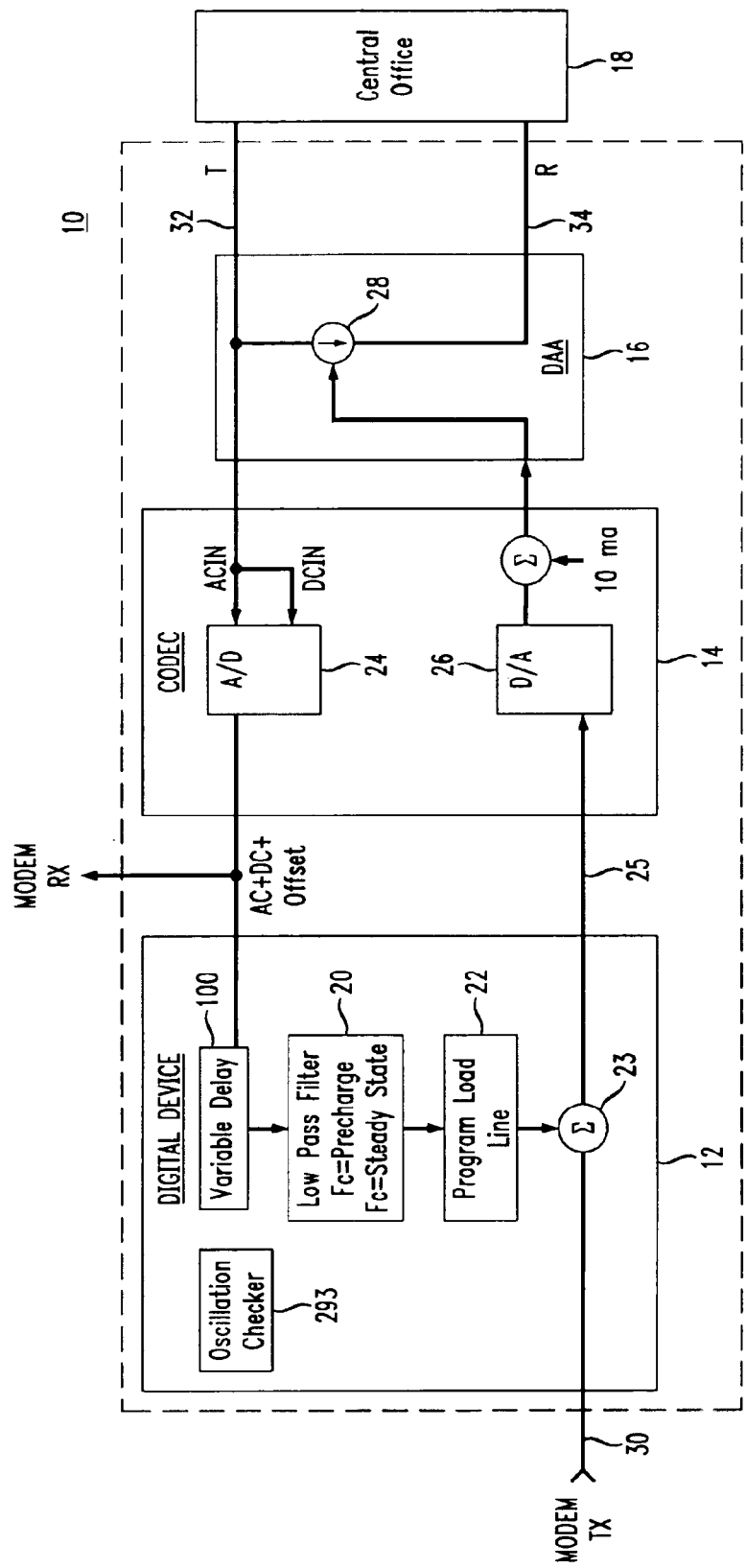
FIG. 1A shows an exemplary system level implementation of an extended feedback gyrator, in accordance with the principles of the present invention.

FIG. 1A shows an exemplary system level implementation of an extended feedback gyrator 10, in accordance with the principles of the present invention.

In particular, as shown in FIG. 1A, a digital gyrator 10 includes a telephone line interface 16 such as a digital access arrangement (DAA), a codec 14 or other device providing analog-to-digital and/or digital-to-analog conversion, and a processor 12, e.g., a digital signal processor (DSP).

The telephone line interface 16 can be, e.g., a resistive termination which is conventionally found on many telephone lines, and which can be as high as, e.g., 3200 ohms. Alternately, the telephone line interface 16 can be an active current source, e.g., as found in private branch exchange (PBX) devices, or on telephone line simulators (TAS) devices typically used to perform modem throughput evaluations. The active current source termination can be as high as 600,000 ohms.

The codec 14 includes an analog-to-digital converter 24, and a digital-to-analog converter 26. The A/D converter 24 and/or the D/A converter 26 may be separate devices instead of within a codec.

The processor 12 may be any suitable processor, e.g., microprocessor, microcontroller, or digital signal processor (DSP). Within the processor 12, a low pass filter 20 is implemented, which generates the basis for a load line 22.

In accordance with the principles of the present invention, the low pass filter 20 implemented in the DSP 12 emulates an inductor, allowing the DC load line 22 to be programmably and/or dynamically adjusted to fit any desired DC template.

Moreover, with stable programmable adjustability of the DC current level of a digital gyrator 10 in accordance with the principles of the present invention, the DC load line can be altered to follow a non-linear path as desired, allowing, e.g., minimization of power dissipation.

As discussed above, when configuring a conventional external gyrator circuit several external components must be switched in or out. In practice, multiple switches are required to cover mutually exclusive start up templates for different countries. In accordance with the principles of the present invention, external circuits are moved into the internal digital domain, resulting in reduced cost and increased flexibility. Moreover, a dynamically adjustable digital filter allows the time constant associated with the adjustable digital gyrator 10 to be changed if instability is detected on a telephone line, in accordance with the principles of the present invention.

Importantly, in accordance with the principles of the present invention, a cutoff frequency of the digital filter may initially allow fast convergence, and then be changed on the basis of detected oscillation by an oscillation checker module 293 to clamp or terminate the oscillation by allowing a slower convergence once steady state has been achieved, providing for stable digital control of the DC current.

Figure 1B:
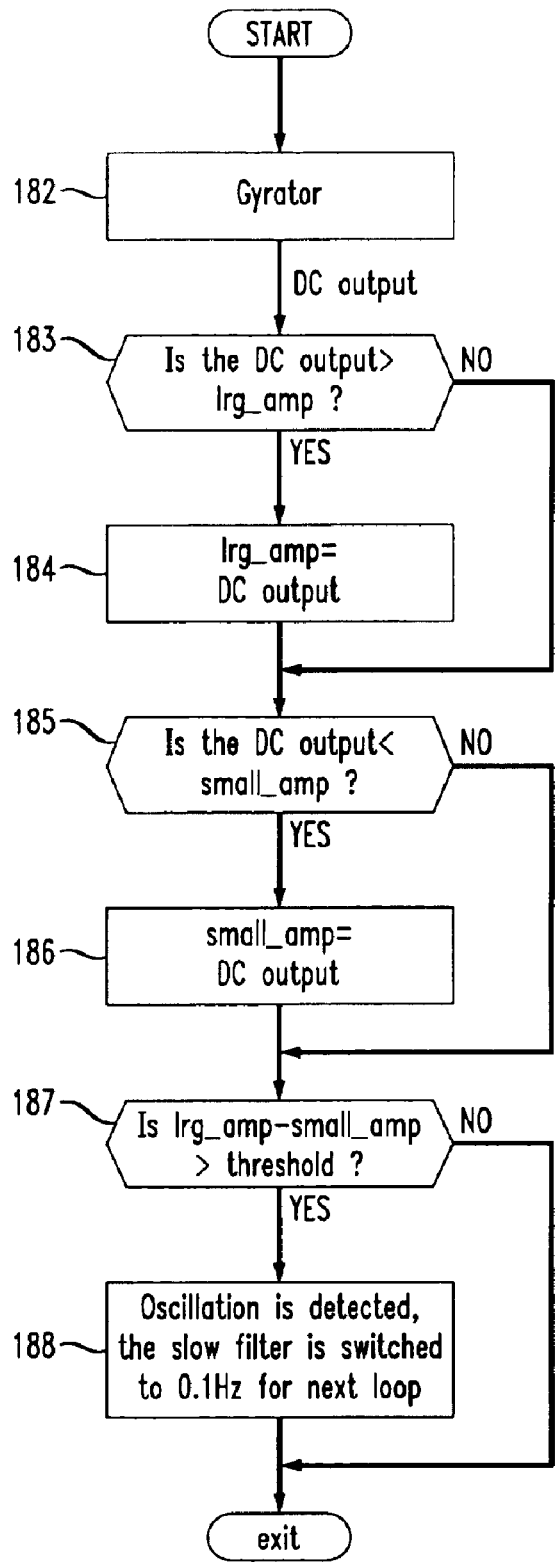
FIG. 1B shows a process carried out by the oscillation checker module shown in FIG. 1A.

FIG. 1B shows a process carried out by the oscillation checker module 293 shown in FIG. 1A.

In particular, as shown in step 182 of FIG. 1B, the DC output of the digital gyrator 10 is measured.

In step 183, the peak of the DC output is determined by comparison to a local peak value Irg_amp. If the currently value of the DC output is not larger than Irg_amp, then the process proceeds to step 185. Otherwise, if the current value is larger than Irg_amp, Irg_amp is given the value of the current measurement as shown in step 184, and the process proceeds to step 185.

In steps 185 and 186, the smallest amplitude is monitored and stored as small_amp.

In step 187, the difference between Irg_amp and small_amp is determined, and compared to a predetermined threshold value defining a stable DC output (i.e., insignificant oscillation).

In step 188, if the threshold is exceeded in step 187, then significant oscillation is detected, and the digital gyrator 10 switches the slow filter to have a 0.1 Hz cut-off frequency for the next processing loop.

Thus, oscillation on the telephone line is checked before deciding to switch the low pass filter 20 of the digital gyrator 10 from having a fast (e.g., 1 Hz) cut-off frequency to having a slow (e.g., 0.1 Hz) cut-off frequency.

After switching from a fast low pass filter (e.g., having a 3 Hz cut-off frequency) to a slow low pass filter (e.g., having a 1 Hz cut-off frequency), the DC loop output is monitored. Many samples in a row from the CODEC 14 are monitored and checked for oscillation.

In particular, comparisons may be run to detect the largest and smallest amplitudes of the DC loop output, as measured through the CODEC 14. If a difference between the largest and smallest amplitudes of the DC loop output is above a given threshold, then a substantial oscillation is determined to be present. As a result, the digital gyrator 10 is then switched to a slow filter, e.g., having a cut-off frequency of 0.1 Hz.

Alternatively, or additionally to the peak amplitudes, minimum and/or average amplitudes may be determined to determine stability. In such a case, if the peak and/or minimum amplitudes are within a given range, stability is determined, and thus substantial oscillation is not present on the telephone line. However, as soon as the output falls outside the given range of stable (i.e., insignificant) oscillation, the digital gyrator 10 is determined to be unstable, or having significant oscillation.

In one embodiment, the ordering of the filters may be as follows:

(1) a fast filter (e.g., a low pass filter having a 10 Hz cut-off);
(2) a slow filter (e.g., a low pass filter having a 1 Hz cut-off); then, if oscillation,
(3) a damping filter (e.g., a low pass filter having a 0.1 Hz cut-off)

Figure 2A:
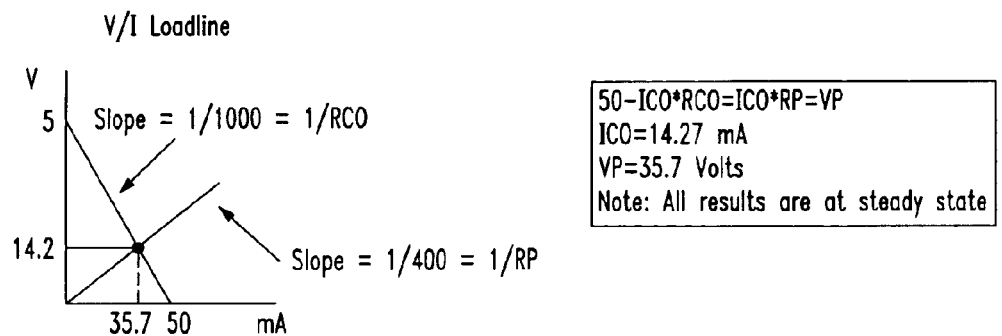
FIGS. 2A and 2B shows a simplified example of a dynamically adaptive digital gyrator, in accordance with the principles of the present invention.
Figure 2B:
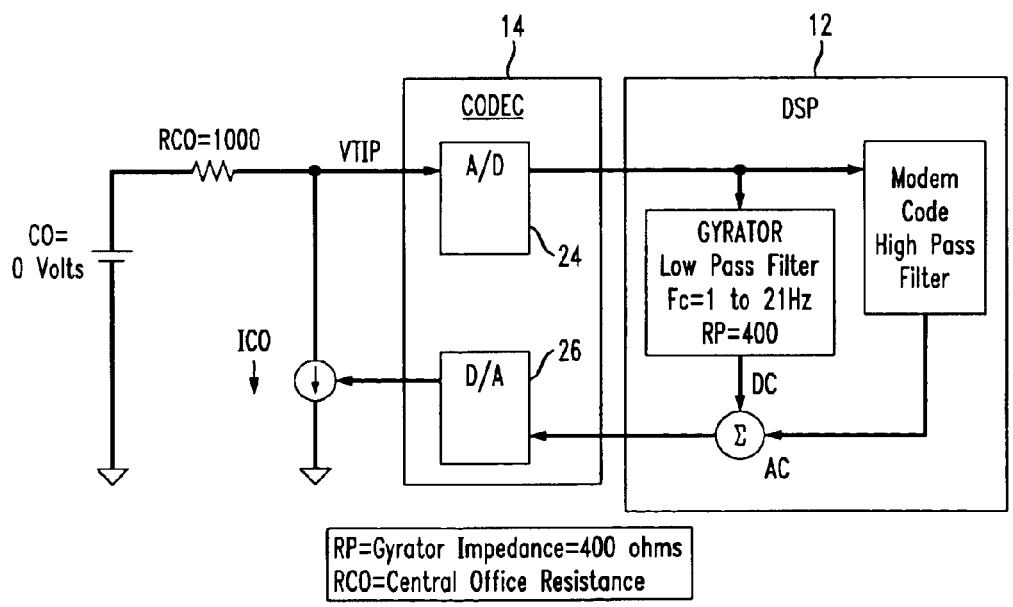

FIGS. 2A and 2B show a simplified example of a dynamically adaptive digital gyrator 10, in accordance with the principles of the present invention.

In particular, as shown in FIGS. 2A and 2B, note that the loadlines at the central office and at the telephone line interface are substantially the same as provided by the conventional gyrator using external components. The final line current and voltage are also the same. A main distinction of the digital gyrator 10 in accordance with the principles of the present invention from conventional gyrators is that the function of the conventional, large, external, inductor is emulated with a lowpass filter inside a processor (e.g., DSP), and that the cutoff frequency of the low pass filter may be dynamically changed if instability is detected upon going off-hook.

Figure 18A:
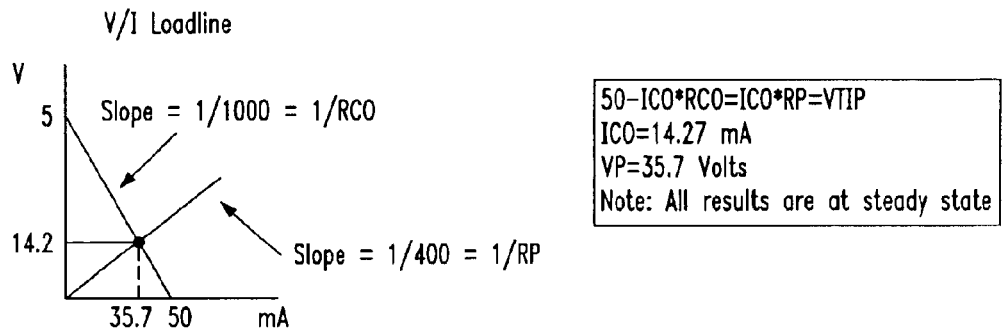
FIG. 18A shows a V/I load line.
Figure 18B:
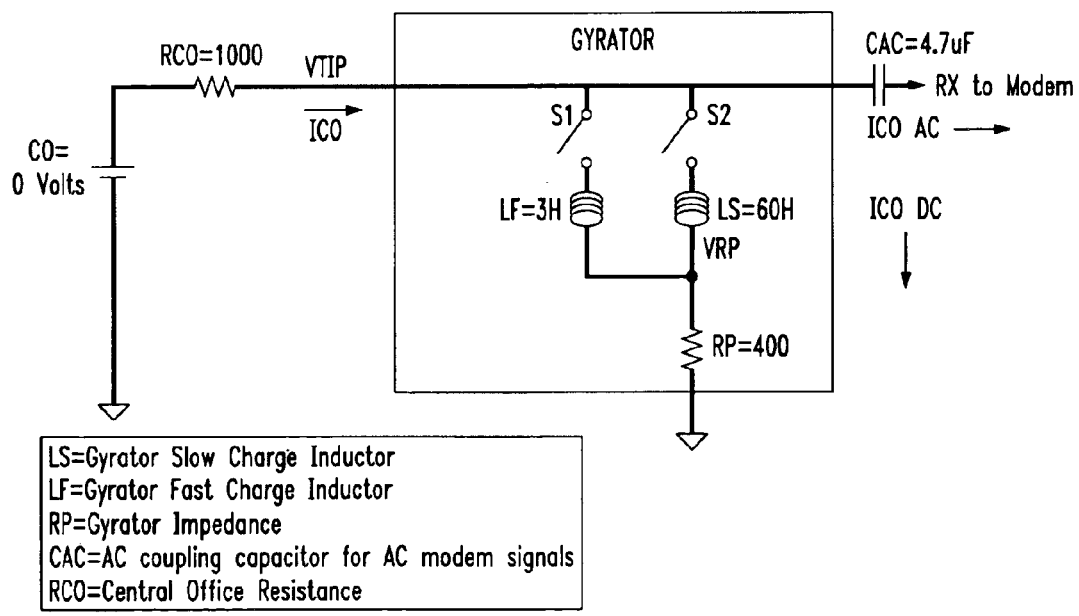
FIG. 18B shows a basic gyrator design which is implemented with external circuitry.

The digital low pass filter 20 (e.g., inside DSP 12 shown in FIG. 1A) emulates the low-pass cutoff frequency from VTIP to VRP shown in FIG. 18B. In this simplified analysis, the central office resistance RCO is ignored.

A stated objective is to achieve a low-pass filter having a particular slow cutoff frequency and a particular fast cutoff frequency for each country, independent of central office loading. The transfer function from VTIP to VRP is as follows:

$$\frac{VRP(f)}{VTIP(f)} = H(f) = \frac{RP}{s \times LS + RP} = \frac{1}{1 + s \times \frac{LS}{RP}}$$

The slow filter cutoff frequency and time constant can be as follows:

$$Fc = \frac{RP}{2 \times \pi \times LS} = 1.06 \text{ Hz}$$

$$5 \times \tau = 5 \times \frac{LS}{RP} = \frac{5 \times 60}{400} = 750 \text{ ms}$$

The fast filter cutoff frequency and time constant can be as follows:

$$Fc = \frac{RP}{2 \times \pi \times LF} = 21.2 \text{ Hz}$$

$$5 \times \tau = 5 \times \frac{LF}{RP} = \frac{5 \times 3}{400} = 37.5 \text{ ms}$$

Note that the slow filter and fast filter cut-off frequencies are designed in order to meet the requirements where the telecommunication device is operating.

The dynamically adjustable digital gyrator 10 in accordance with the present invention will be further described with reference to the codec 14 and the telephone system interface (FIGS. 3 and 4), the DSP 12 (FIG. 5), the DC loop low pass filter 20 inside the DSP 12 (FIGS. 6–12B), and finally the detection of an oscillation and adjustment of the cutoff frequency of the digital low pass filter 20 to a lower cutoff frequency to stabilize any oscillations from the low pass filter 20 upon taking the modem off-hook (FIGS. 13A–15)

Figure 5A:
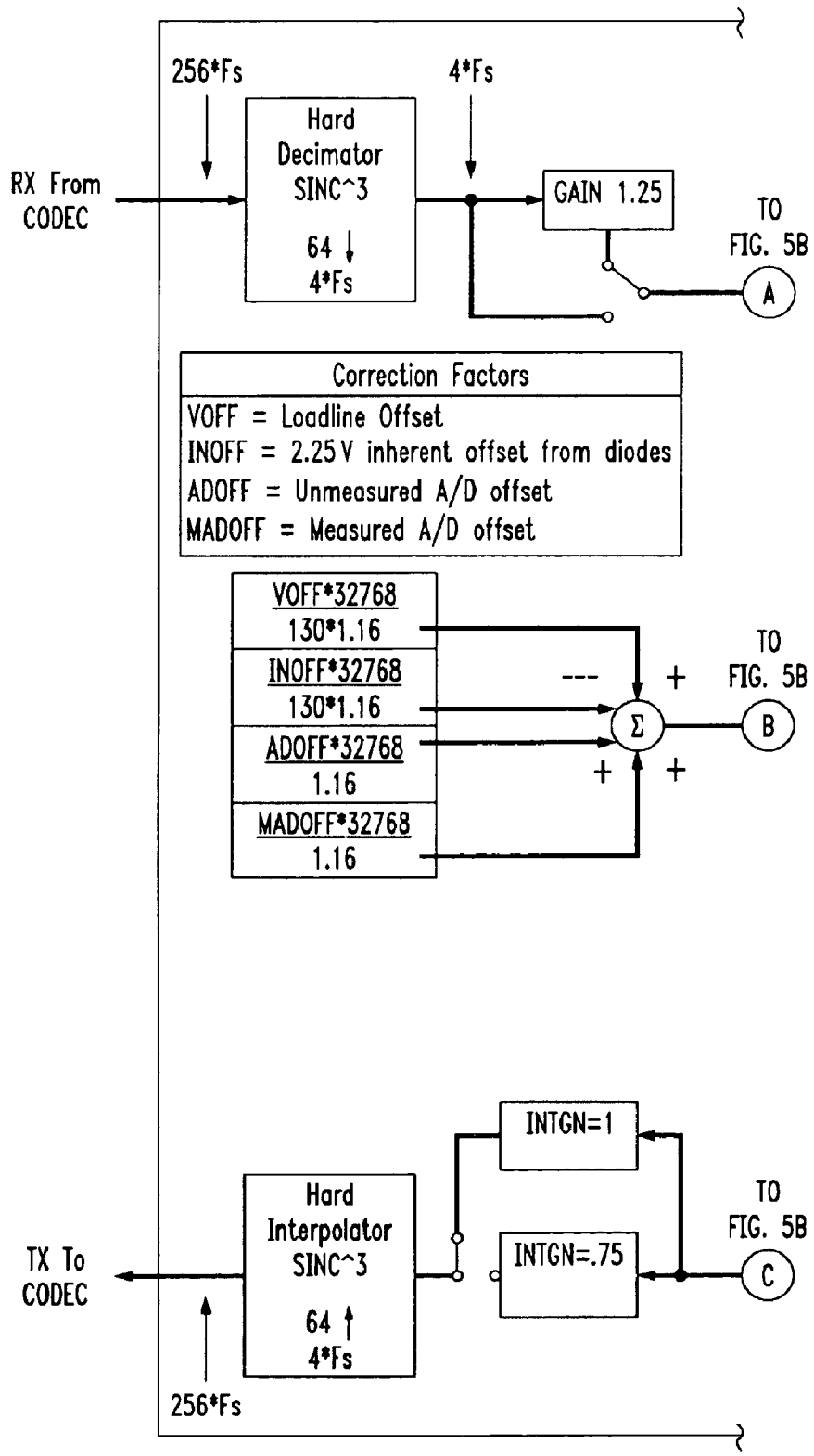
FIG. 5 shows a detailed description of an exemplary DSP gyrator path block diagram, in accordance with the principles of the present invention.
Figure 5B:
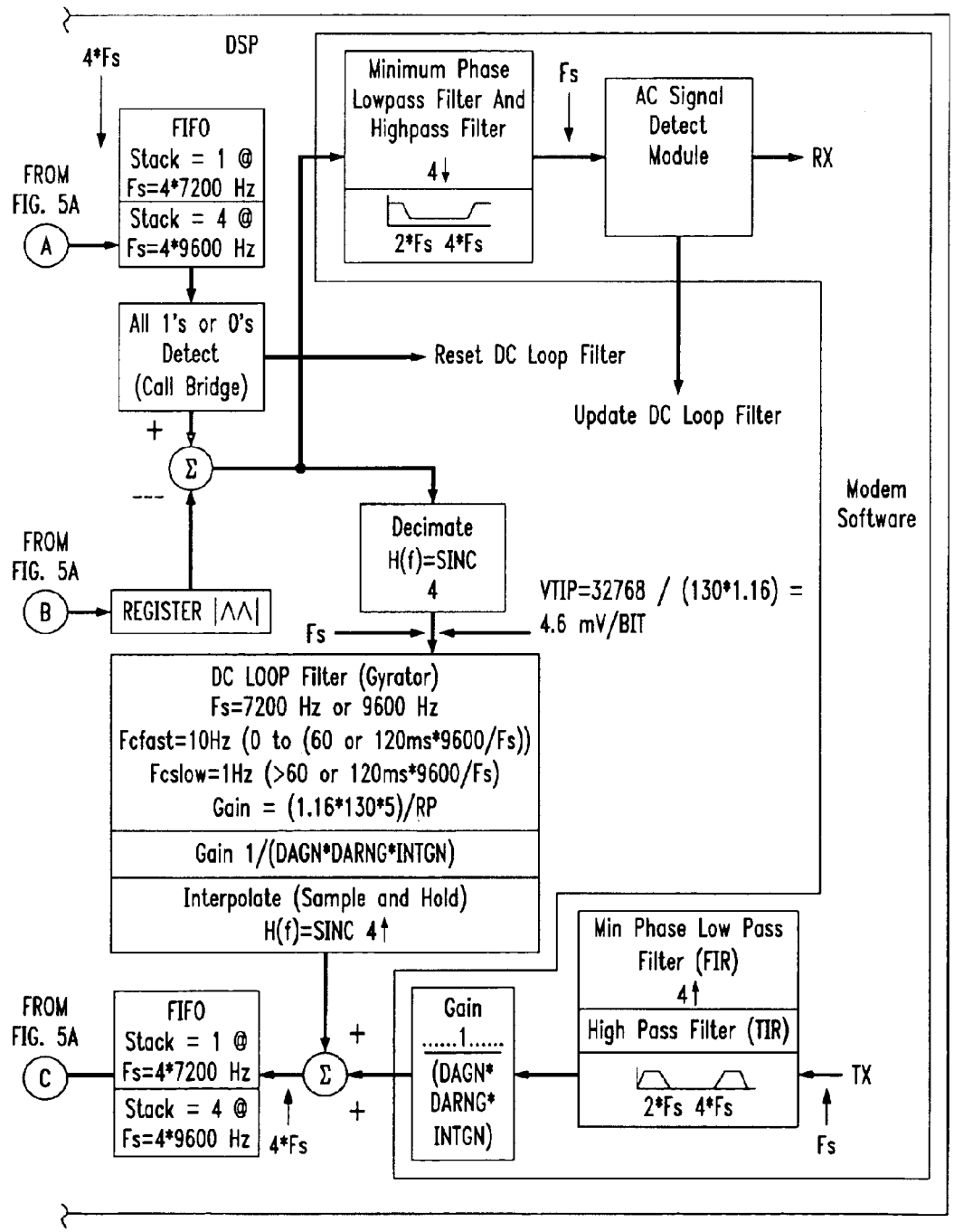

In particular, FIG. 5 shows a detailed description of a dynamically adjustable digital gyrator 10, and external impedances associated with setting the DC loadline, in accordance with the principles of the present invention.

Figure 3A:
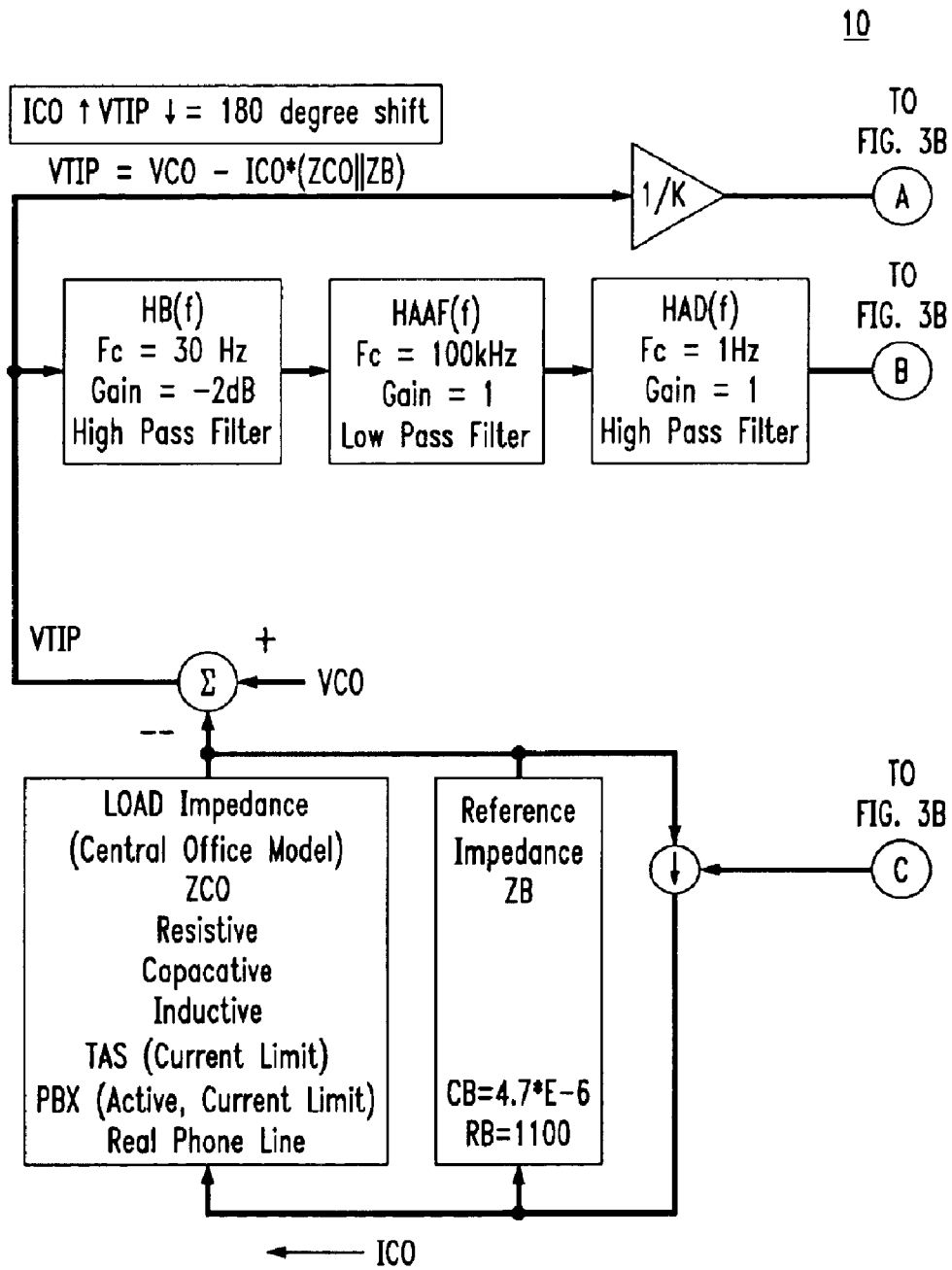
FIG. 3 shows a telephone interface of a dynamically adjustable digital gyrator, and external impedances associated with setting the DC loadline, in accordance with the principles of the present invention.
Figure 3B:
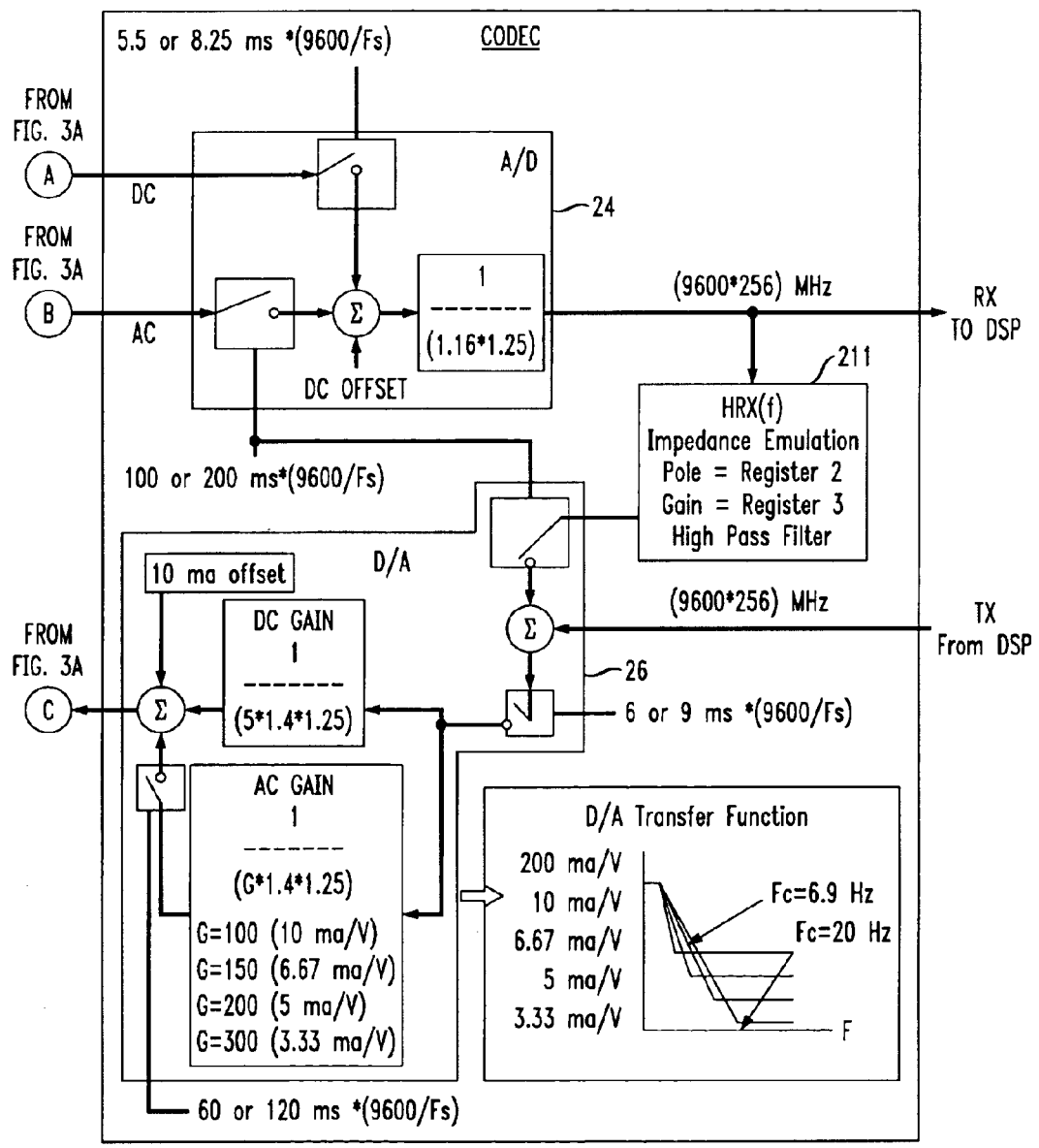

In particular, as shown in FIG. 3, complex impedances have been included for this analysis as they are needed to predict stability. The analysis is begun with the voltage VTIP (voltage at the RJ-11 connector).

Gyrator A/D Path

Starting at the upper left of FIG. 3, VTIP takes two paths before being converted to the digital domain by the A/D converter. The first path is DC coupled and divided by a constant "K". "K" was chosen based on the following constraints:

Maximize the A/D usable signal to noise ratio S/(N+D) for the AC input.

This leaves +/−0.16 volt peak for the DC coupled input.

Ensure that the startup DC voltage after going off-hook fits in the A/D range of +/−1.16 volts.

Ensure that the normal operating TIP DC voltage of 20 volts fits in +0.16 volts (20/K=0.153)volts.

The AC coupled path of VTIP into the A/D converter 24 is also attenuated. This is done because it was desired to drive and receive 1 volt uncorrelated signals simultaneously. This means that the VTIP signal could be as large as 1.25 volts peak. The VTIP signal is attenuated by 2 dB before input into the A/D 302. This allows the VTIP transmit and receive signals to be as large as 1.25 volts peak before clipping will occur. The modem training sequence adjusts the transmit and receive signal to assure that clipping does not occur.

The VTIP AC coupled and DC coupled signals are not immediately sent to the DSP 12 after going off-hook. First the DC offset of the A/D 24 must be measured by the DSP and cancelled. This is done by opening the AC and DC inputs of the A/D 24 for the first 5.5 ms. During this first 5.5 ms the A/D output to the DSP 12 will contain only the A/D DC offset. The A/D internal switches connect the AC and DC inputs to the internal signal ground during this time period. The DSP code can use this time to measure the A/D DC offset voltage. At 5.5 ms the DC input of the A/D is enabled and the A/D output will now contain the DC offset+VTIP/K, (note that the AC input is still disabled). The AC input will not be enabled until 200 ms after going off-hook. The idea is to converge the DC loadline (gyrator) as fast as possible after the 5.5 ms timer.

Once the DC and AC are enabled an additional DC offset is added to the signal which was not measured and therefore will not be cancelled. This offset has been estimated to be −8 mV and is caused by the A/D sampling wide band noise at its input. As noted before, every 8 mV of DC out of the A/D represents a 1 volt error in the VTIP voltage. In this case, −8 mv of uncancelled DC offset would yield a VTIP voltage which is 1 volt too high. The modem software adds 8 mv to the modem receive samples to cancel the DC offset. The A/D output startup timing sequence is as follows:

| Time | A/D Output | DSP input After A/D offset Calibration |
| --- | --- | --- |
| 0 to 5.5 ms | A/D DC offset | Zero |
| 5.5 to 200 ms | A/D DC offset + VTIP/K + A/D offset shift | VTIP/K + A/D offset shift |
| >200 ms | A/D DC offset + VTIP/K + VTIP/1.25 (AC coupled) + A/D offset shift | VTIP/K + VTIP/1.25 (AC coupled) + A/D offset shift |

Gyrator D/A Path

Note that in FIG. 3 the D/A and Line Modulator are combined and are collectively referred to as 'the D/A' 26.

Referring to FIG. 3, the input to the DA 26 is comprised of three sources, the first source is the transmit signal from the DSP 12, the second source is the impedance emulation filter 211, and the third source is a default current of +10 mA. This default current may be used so that the DSP 12 does not have to get involved in startup to provide enough current to power the DAA 16. The DAA 16 needs at least 8 mA of line current for normal operation. The D/A 26 has a fixed gain of 1.25. This gain normalizes the path from the A/D 24 through the emulation filter 211 which has a gain of 0.8 and from the DSP 12 which has a gain of 0.8. The D/A output range is +/−1.4 volts. The output of the impedance emulation filter 211 is the A/D output in series with a highpass filter. Since the impedance emulation filter is a highpass filter with a zero on the unit circle (zero at DC), the effect on the DC loadline is minimal. The filter is only included here for completeness and because it does affect loop stability (phase margin).

The D/A output has an AC and DC component. Every 5 mV of DC produces 1 mA of line current or 200 mA/V. The second signal is the AC component. The AC gain is selectable at the output of the D/A 26. The possible gains are 3.33, 5, 6.67, and 10 mA/V. Again, as with the A/D, clipping will also shift the DC and affect the DC loadline.

Figure 4:
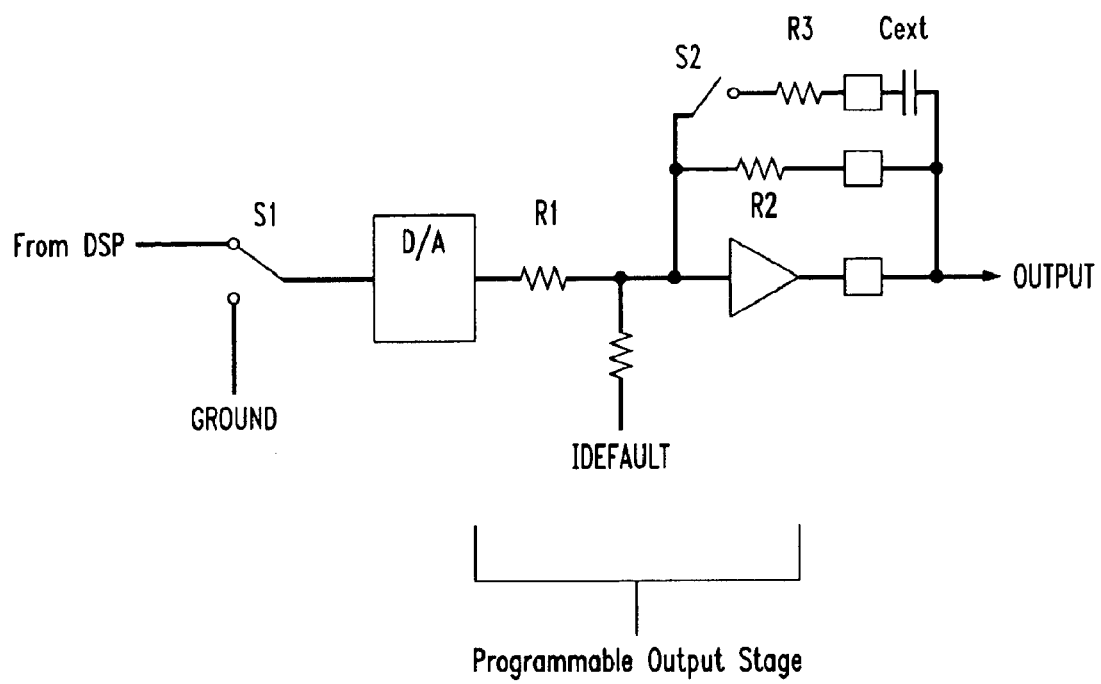
FIG. 4 shows a simplified digital to analog conversion path.

FIG. 4 shows a simplified digital to analog conversion path.

In particular, as shown in FIG. 4, the D/A path goes through three phases at startup which are controlled by two timers. The startup sequence is as follows:

1. From 0 to 6 ms, S1 is switched to ground so the D/A output is essentially 0V. Switch S2 is open to remove the AC feedback which reduces the output settling time. IDEFAULT drives the output to the proper level for the gyrator to pull 10 mA of line current.
2. After 6 ms S1 switches to the DSP output signal, closing the DC loadline feedback loop. The output stage has wide frequency response (S2 still open) so the line current will quickly settle to the proper level, based on the VI template in the DSP program. This means that the AC gain during this stage is also 200 mA/V.
3. After 60 ms the DC loop has settled. Now S2 is closed and the AC response is set by the selected value of R3. Once this occurs the corner frequency of the D/A transfer function is 20 Hz for the 3.33 mA/V gain setting and 6 Hz for the 10 mA/V gain setting with the AC gain switch is closed, a step in DC current will take up to 5 seconds to converge. The goal is to achieve DC convergence before the AC gain switch closes.

The D/A path output stage drives a current source which is in parallel with ZB(f) (The reference load impedance on the modem) and ZCO(f) (the central office impedance). The voltage from this parallel combination is subtracted from VCO to produce the TIP voltage VTIP.

Gyrator—DSP Block Diagram

FIG. 5 shows a detailed description of an exemplary DSP gyrator path block diagram, in accordance with the principles of the present invention.

In particular, as shown in FIG. 5, the RX data from the DAA is input into the DSP (top left corner) at a rate of Fs*256 where Fs is the modem sample rate. This data is passed through a hardware SINC^3 decimation filter. The output of the filter is at a Fs*4 rate. This output is stored in a FIFO. The FIFO length varies based on sample rate. The output of the FIFO is sent through a minimum phase lowpass filter and a highpass filter strips the DC component from the modem receive signal. This output is then sent to the modem software for processing. The FIFO output is also input into the DC LOOP filter or Gyrator.

The DC loop filter, or Gyrator, operates at Fs rate. In order to decimate to the Fs sample rate, every four samples are added together and divided by 4. This is equivalent to passing the data through a SINC filter. Accordingly, as shown in FIG. 5, the FIFO output is passed through a SINC filter prior to the gyrator, in accordance with one aspect of the invention. The SINC response serves as a decimating lowpass filter, attenuating signal energy in the Fs+/−10 Hz, 2 Fs +/−10 Hz and 3Fs +/−10 Hz bands by more than 60 dB so that they will have minimal effect on the DC loop. This SINC filter has been shown to decrease fluctuations in the TIP voltage on noisy phone lines. The output of the SINC filter is passed to the Gyrator which is a lowpass filter with a Fc (i.e., cut-off frequency) of 10 Hz or less.

Register 1AA1

The input to the gyrator is comprised of 5 sources which are shown at the left corner and center of FIG. 5. The first source is the decimated data out of the FIFO. Register 1AA1 is subtracted from the output of the FIFO. The value of register 1AA1 is set on a per country basis. The contents of 1AA1 are as follows:

1. VOFF—This is the desired loadline offset which can vary in each country. This value will be subtracted from each incoming sample.

2. INOFF—This value is equal to the loss in voltage from the bridge rectifier diodes and the switch hook from VTIP to the A/D input. This loss has been averaged to be 2.25 volts. If this value was not normalized the VI loadline would have a 2.25 volt offset.
3. ADOFF—This is equal to the A/D offset which was not measured. The offset guess is −8 mv which has been arrived at from field testing.
4. MADOFF—This is equal to the measured A/D offset which has been stored by the DSP. Since the contents of this register are subtracted from the incoming samples the A/D offset will be nulled.

In the following example, it is desired to set the DC loadline to have an offset voltage of 3.8 volts. The measured A/D offset will be 0 V for this example. The user will set DSP register 1AA1 to the following value:

$$MADOFF = 0 \text{ Volts} \quad \frac{0}{1.16} \times 32768 = 0$$

$$ADOFF = -8 \text{ mV} \quad \frac{-.008}{1.16} \times 32768 = -226$$

$$INOFF = 2.25 \text{ Volts} \quad \frac{2.25}{130 \times 1.16} \times 32768 = 489$$

$$VOFF = 3.8 \text{ Volts} \quad \frac{3.8}{130 \times 1.16} \times 32768 = 825$$

Register 1AA1=VOFF*scale−INOFF*scale+ADOFF*scale+MADOFF*scale

Register 1AA1=825−489+−226+0=110

Gyrator Input=FIFO Output−Register 1AA1

Figure 6:
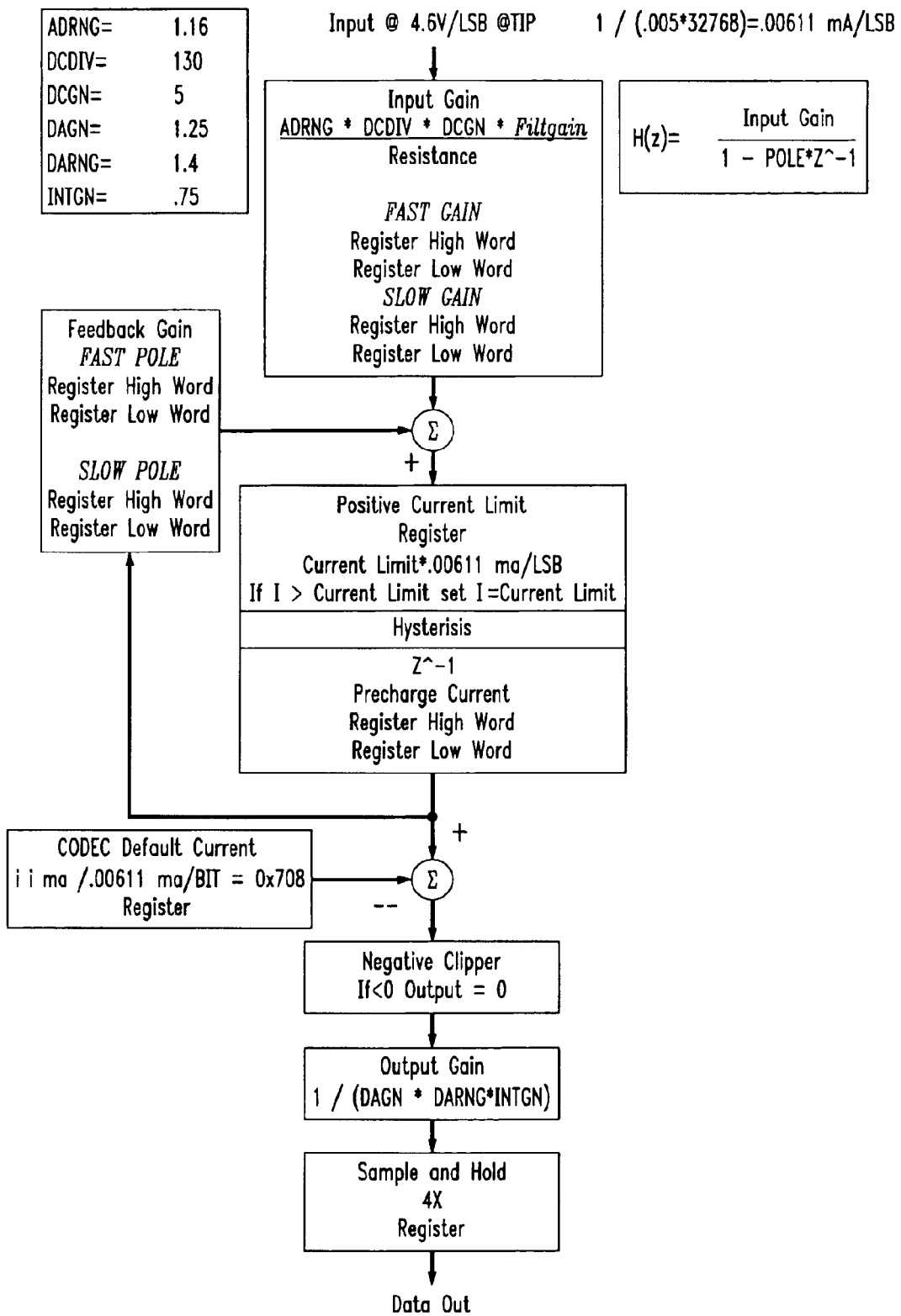
FIG. 6 shows an exemplary block diagram of a DC loop lowpass filter of a dynamically adjustable digital gyrator, in accordance with the principles of the present invention.

FIG. 6 shows an exemplary block diagram of a DC loop lowpass filter of a dynamically adjustable digital gyrator, in accordance with the principles of the present invention.

DC Loop Lowpass Filter Input Gain and Pole

The input gain of the lowpass filter is equal to $$\frac{ADRNG \times DCDIV \times DCGN \times Filtgain}{RESISTANCE(RP)}.$$

The variables ADRNG, DCDIV, DCGN and Filtgain are all use to normalize the feedback loop. The RESISTANCE variable is used to set the DC resistance looking into DAA. ADRNG is equal to the clipping voltage on the A/D converter which is 1.16 volts. DCDIV is equal to 130 which is the scale factor from TIP to the DC input of the A/D converter. DCGN is equal to 5, or one over the DC gain through the D/A which is 200 mA/V or ⅕. Filtgain is calculated to normalize the filter gain based on the cutoff frequency.

All filter examples in this document use a 7200 Hz sample rate. If any other sample rate is used, frequency domain plots should be adjusted by Fs/7200.

Figure 7A:
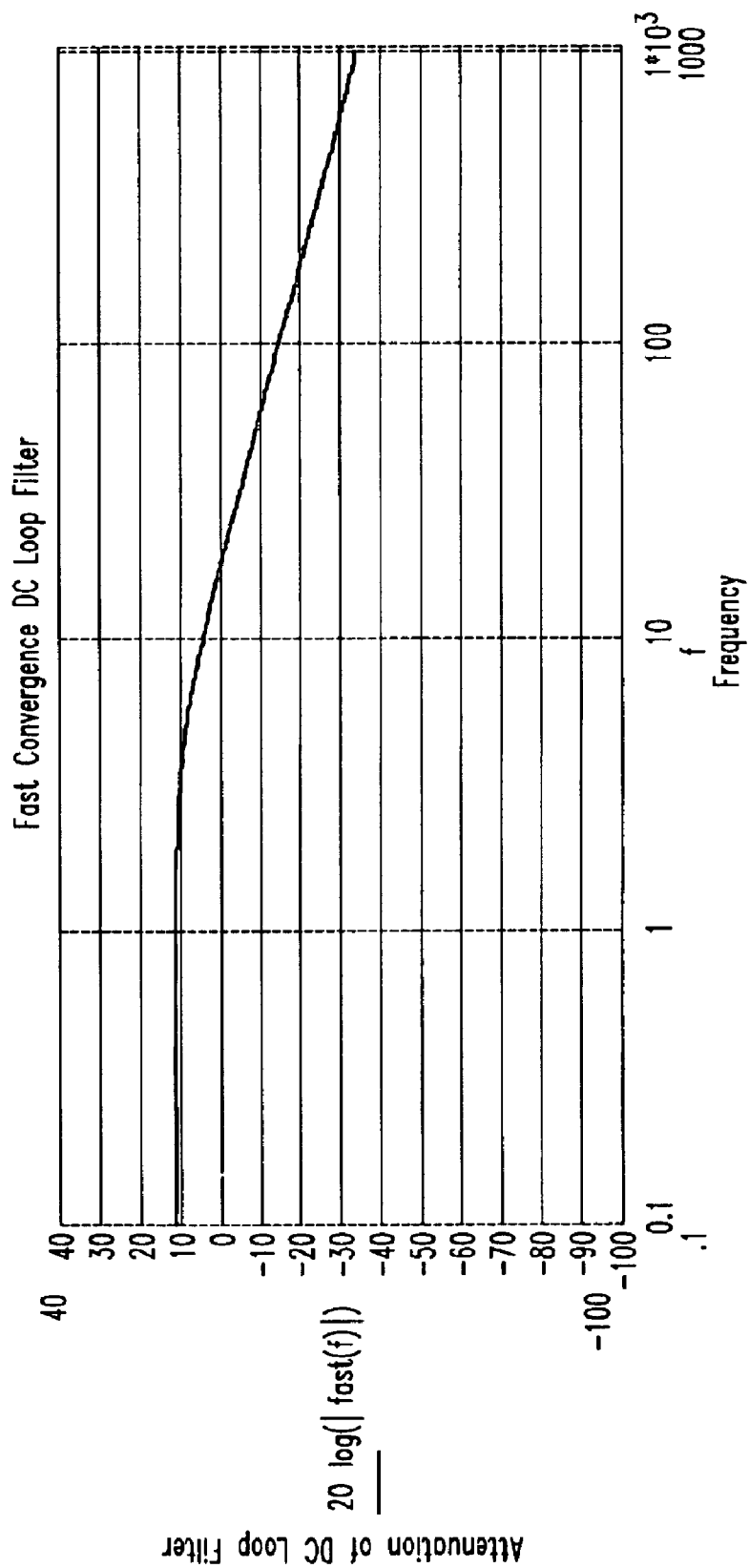
FIGS. 7 and 8 depict the intermediate signal value W(n) and the output Y(n) of the filter, respectively, in accordance with the present invention.
Figure 7B:
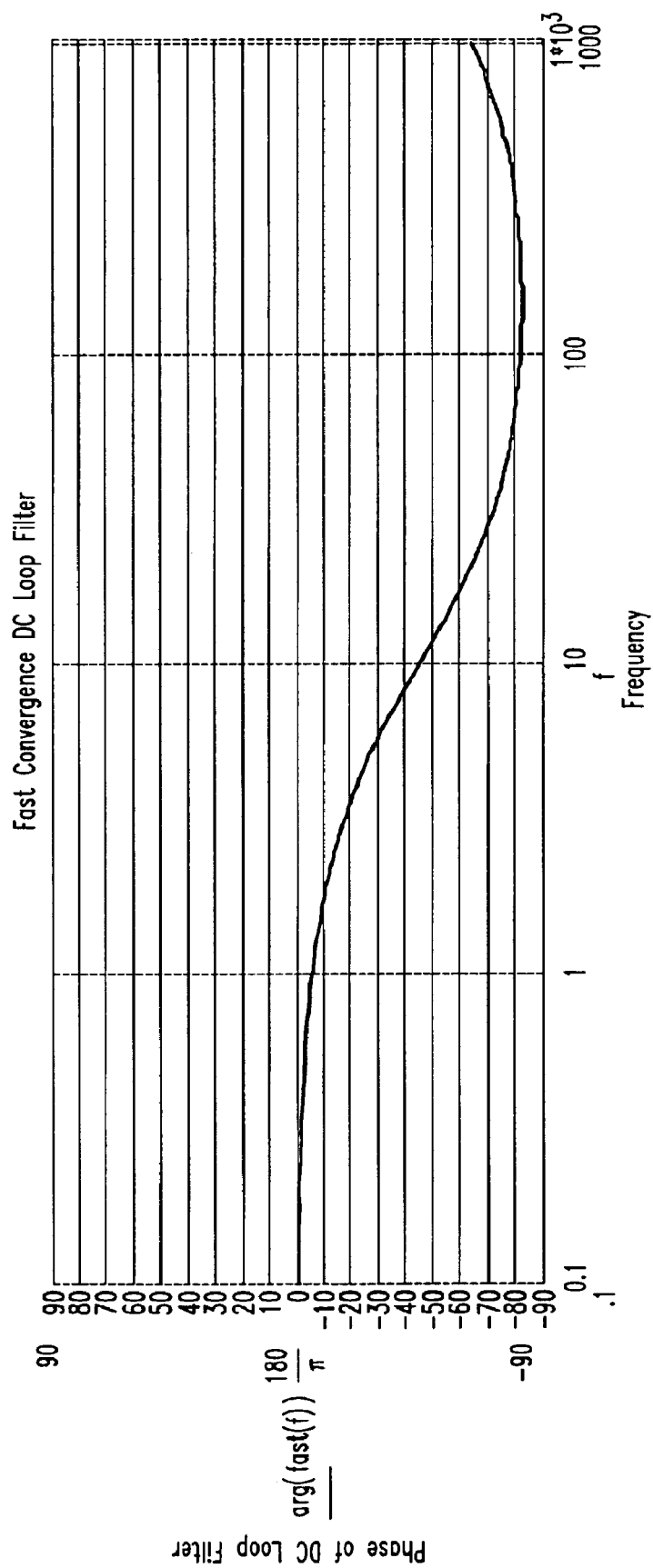

FIGS. 7A and 7B show exemplary gain and phase plots, respectively, for a filter having a 10 Hz fast convergence DC loop filter gain and phase, in accordance with the principles of the present invention.

Figure 8A:
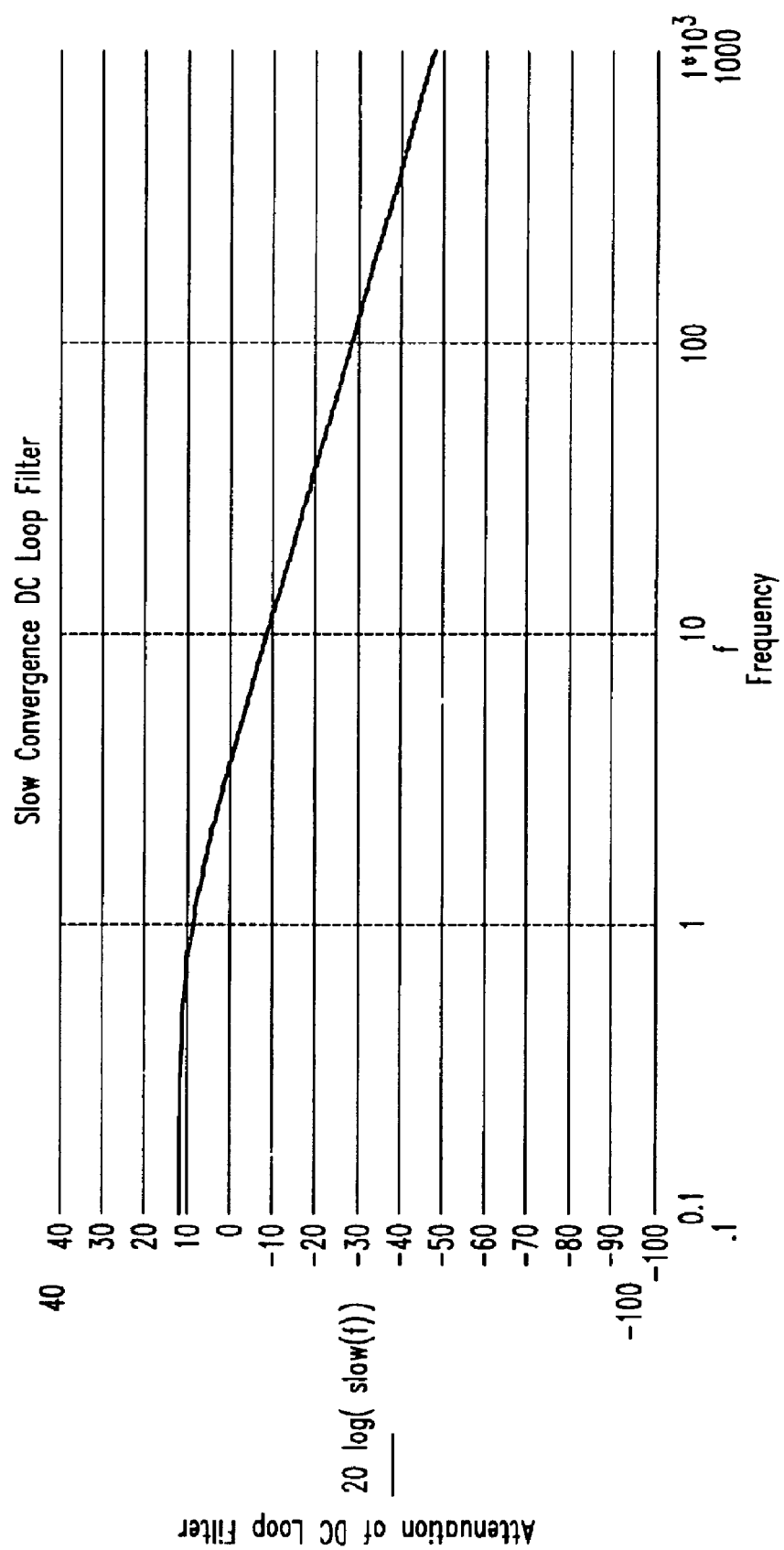
Figure 8B:
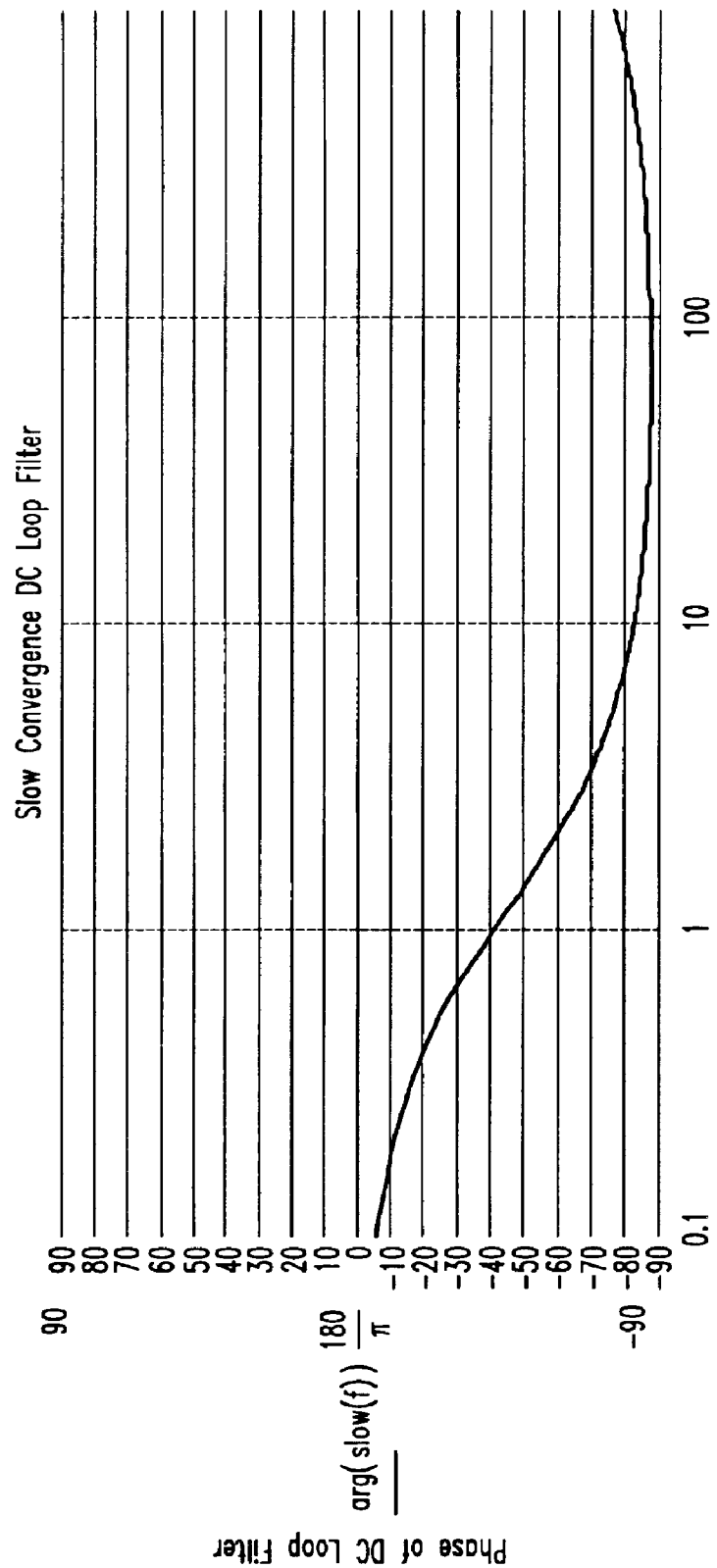

FIGS. 8A and 8B show exemplary gain and phase plots, respectively, for a filter having a 1 Hz slow convergence DC loop filter gain and phase, in accordance with the principles of the present invention.

The plots of FIGS. 7A to 8B relate to lowpass filters only for a dynamically adjusted digital gyrator in accordance with the principles of the present invention. The resistance used for this example is 220 ohms. Note that the filter has gain at DC of +11 dB. The overall gain of the filter of FIG. 6 varies with the resistance RP. Note that the negative phase shift at frequencies below 10 Hz increases as the filter cutoff frequency is lowered. Therefore making the cutoff frequency lower decreases system gain, but does not necessarily increase the system phase margin.

When the filter gain and pole are switched from fast to slow filters (10 Hz to 1 Hz) the fast gain must be held for one sample to avoid glitching the filter output.

Figure 9:
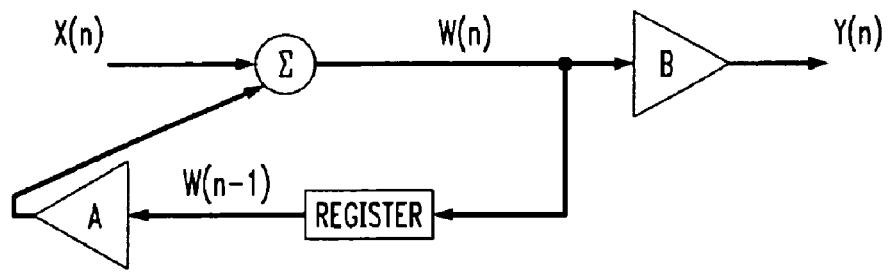
FIG. 9 shows a simple first order filter topology, in accordance with the principles of the present invention.

FIG. 9 shows a simple first order filter topology, in accordance with the principles of the present invention.

In particular, as shown in FIG. 9, a difference equation for the filter is as follows: $Y(n)=(X(n)+A*W(n-1))*B$. A is equal to the pole of the filter. B is used to normalize the overall gain. When the cutoff frequency of the filter is switched both A and B will change. Y(n) must not change when A and B are switched. If both A and B are switched simultaneously, the output Y(n) will have a large glitch (Y(n) approaches 0 and builds back up to the steady state value) due to the new gain setting.

To calculate the magnitude of the glitch we will examine the difference equation for the two cutoff frequencies:

$Yf(n)=(X(n)+Af*Wf(n-1)*Bf$ (Fast Cutoff)

$Ys(n)=(X(n)+As*Ws(n-1)*Bs$ (Slow Cutoff)

The output of the filter converges to a DC value, therefore the output before switching to the slow cutoff must be the same as the value after switching. This allows us to set Yf(n)=Ys(n).

$Yf(n)=Wf(n)*Bf$ $Ys(n)=Ws(n)*Bs$ setting Yf(n) equal to Ys(n) yeilds:

$Wf(n)*Bf=Ws(n)*Bs$ $Ws(n)=(Bf/Bs)*Wf(n)$

This equation shows that if we multiply the registered Wf(n−1) times Bf/Bs at the same time as the gain and pole are being changed, the output will remain unchanged.

Figure 10:
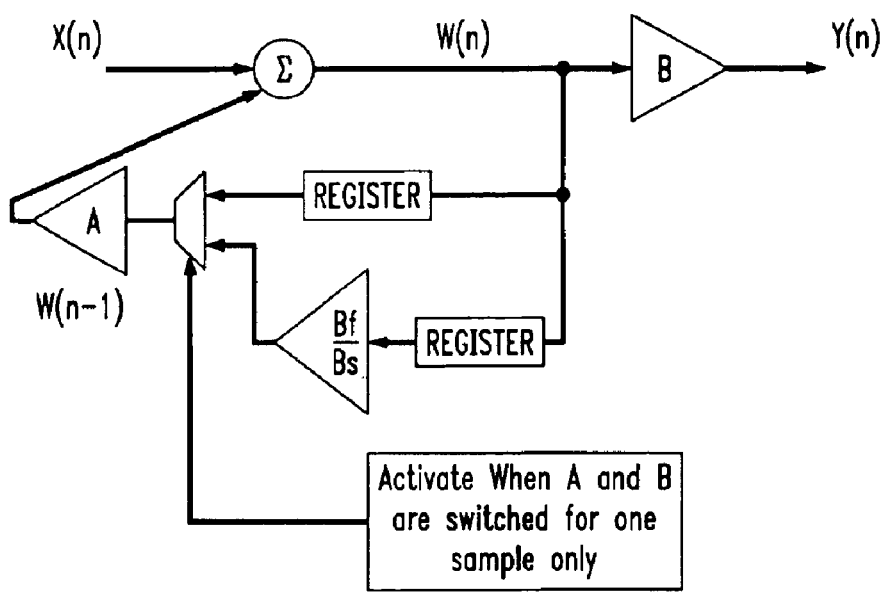
FIG. 10 shows the final low pass topology with glitch removed, in accordance with the principles of the present invention.

FIG. 10 shows the final low pass topology with glitch removed, in accordance with the principles of the present invention.

In particular, as shown in FIG. 10, to normalize the filter with unity gain at DC, B is set to 1-A.

DC Loop Lowpass Filter Current Limit and Hyteresis

Many countries require that the DC current be limited to a specific value. The DC loop filter has a DSP register location which defines the current limit for each country. The input to the DC loop filter contains both the AC and DC portion of the TIP voltage. If the AC voltage is not completely filtered by the DC loop filter and the DC current is just at the current limit setting, distortion will occur.

Figure 11A:
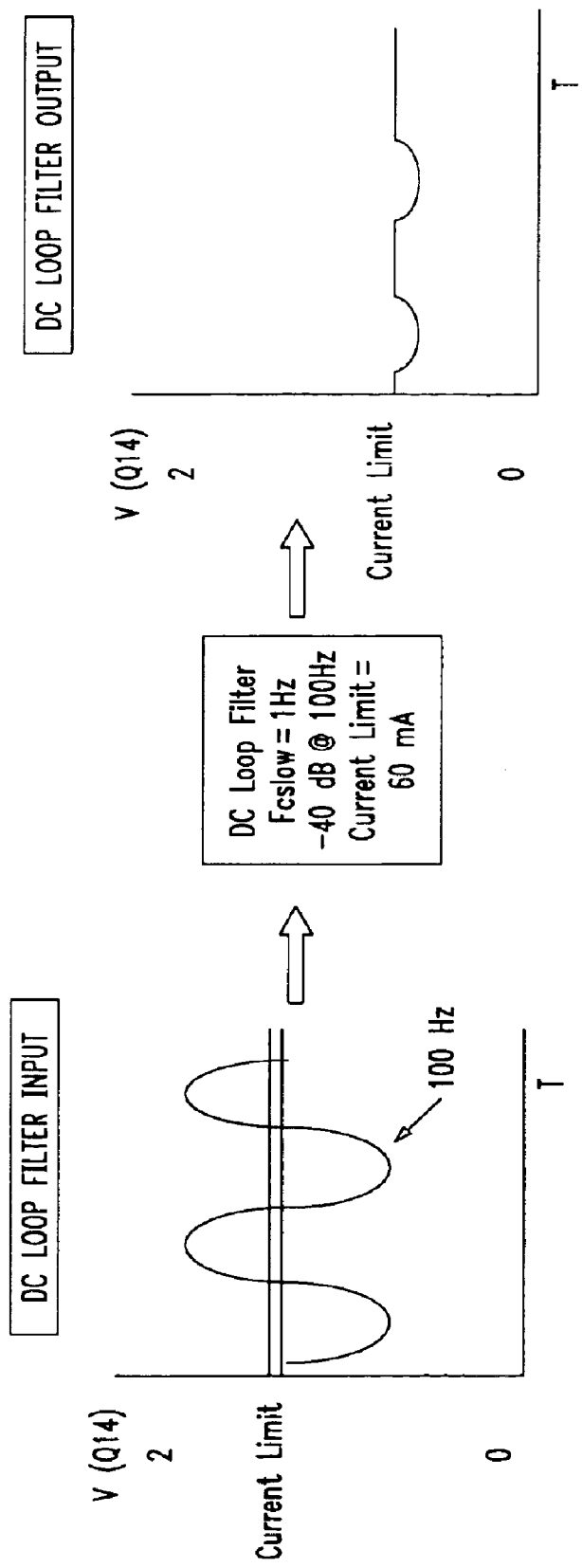
FIG. 11A shows an exemplary DC loop filter without hysterisis.
Figure 11B:
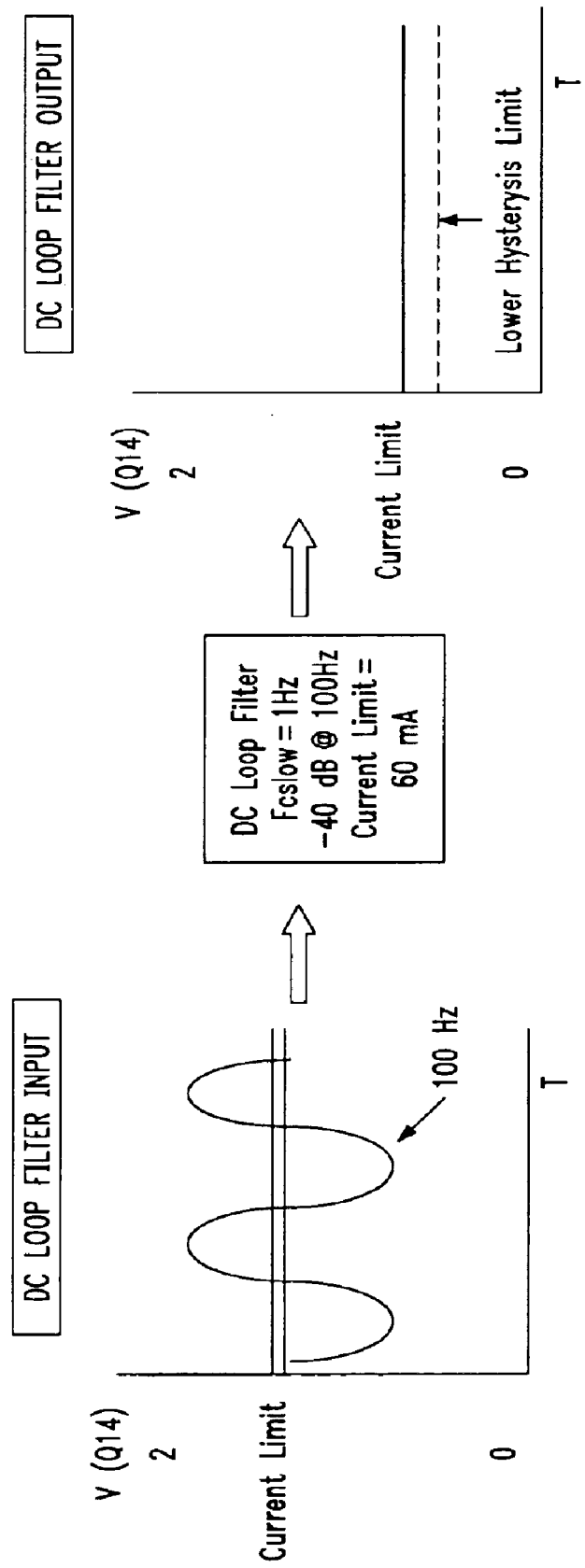
FIG. 11B shows an exemplary DC loop filter with hysterisis.

FIG. 11A shows an exemplary DC loop filter without hysterisis, and FIG. 11B shows an exemplary DC loop filter with hysterisis.

In particular, FIG. 11A shows an example without hysterysis. If the DC level is very close to the current limit any AC signal present after the low-pass filter will push the signal into current limit and clip the positive signal swing. The negative swing of the residual AC signal will be unaffected as it is less than the current limit. The result will look like a clipped AC waveform. The resulting distortion can degrade the modem S/D to 40 dB for low frequency signals. Remember that this distorted signal will be added to the transmit signal and sent to the D/A. The distortion is worse for low frequency signals than high frequency signals because there is less attenuation through the DC loop low-pass filter and thus the clipped signal will be larger relative to the original signal. In the example a 100 Hz signal is fed into the filter with the DC information. The 100 Hz AC signal will be attenuated by 40 dB by the first order low-pass filter. The resulting distortion will be large enough to affect modem throughput.

As shown in FIG. 11B, hysteresis may be added to the current limit block to avoid clipping the signal. Once the current limit has been reached, the signal must go below the current limit value by the hysteresis amount to stop outputting the current limit value. The hysteresis level is preferably set based on the following criteria:

The frequency of the lowest frequency AC signal present; and

The attenuation value of the lowest frequency signal while the slow filter is running.

For example, if it is determined that the lowest frequency AC signal at the output of the DC loop filter will be reduced by 40 dB and the signal could be full scale at the input of the filter, then the hysteresis should be 1% of full scale to assure a distortion free output.

Figure 12A:
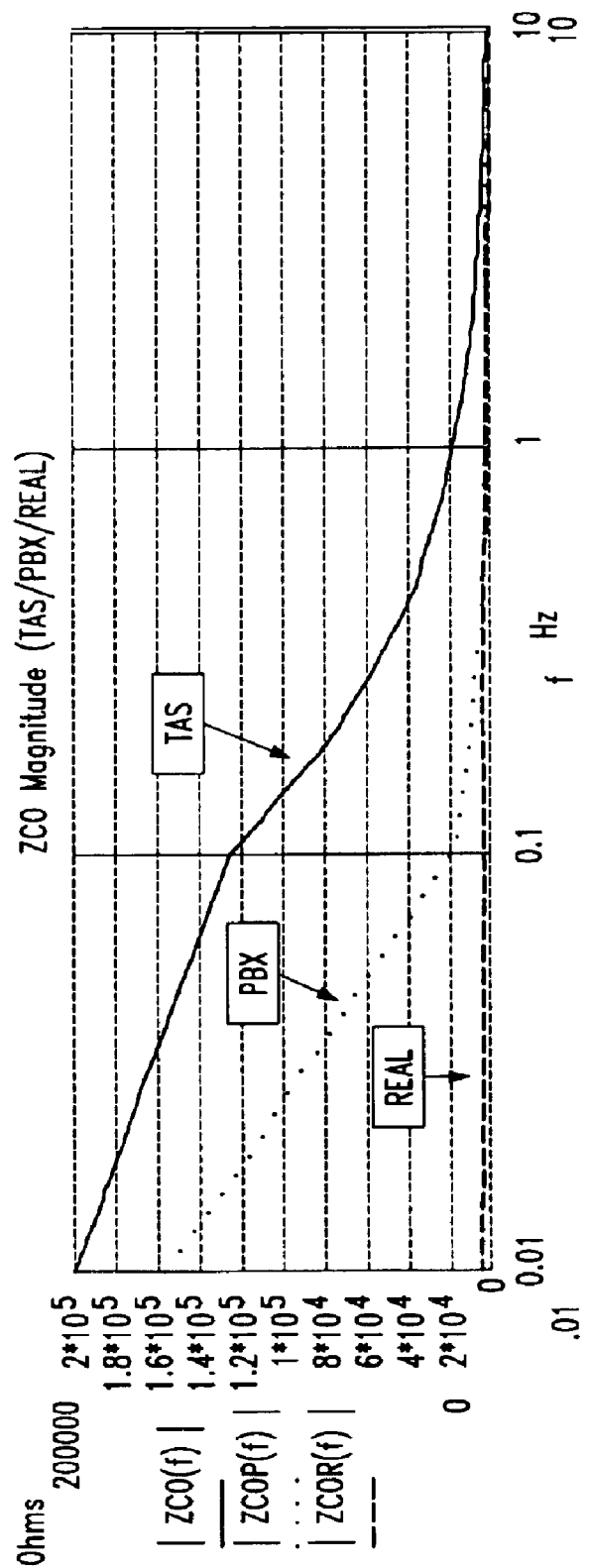
FIGS. 12A and 12B show a typical VI load line (magnitude and phase, respectively) for the three common terminations (i.e., for TAS, for PBX, and for REAL) in the 0 to 10 Hz region, where stability is of particular concern.
Figure 12B:
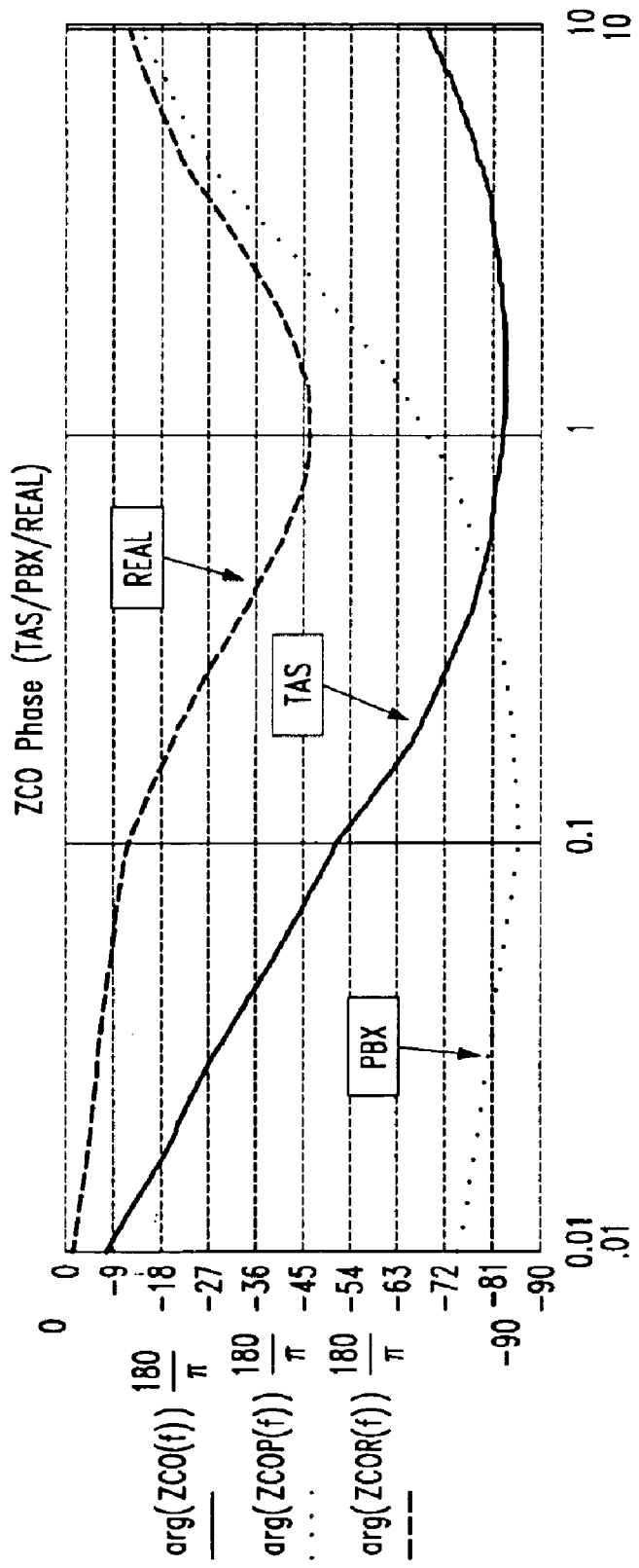

FIGS. 12A and 12B show a typical VI load line (magnitude and phase, respectively) for the three common terminations (i.e., for a REAL telephone line, for a telephone line simulator TAS, and for a private branch exchange PBX) in the 0 to 10 Hz region, where stability is of particular concern.

Figure 13A:
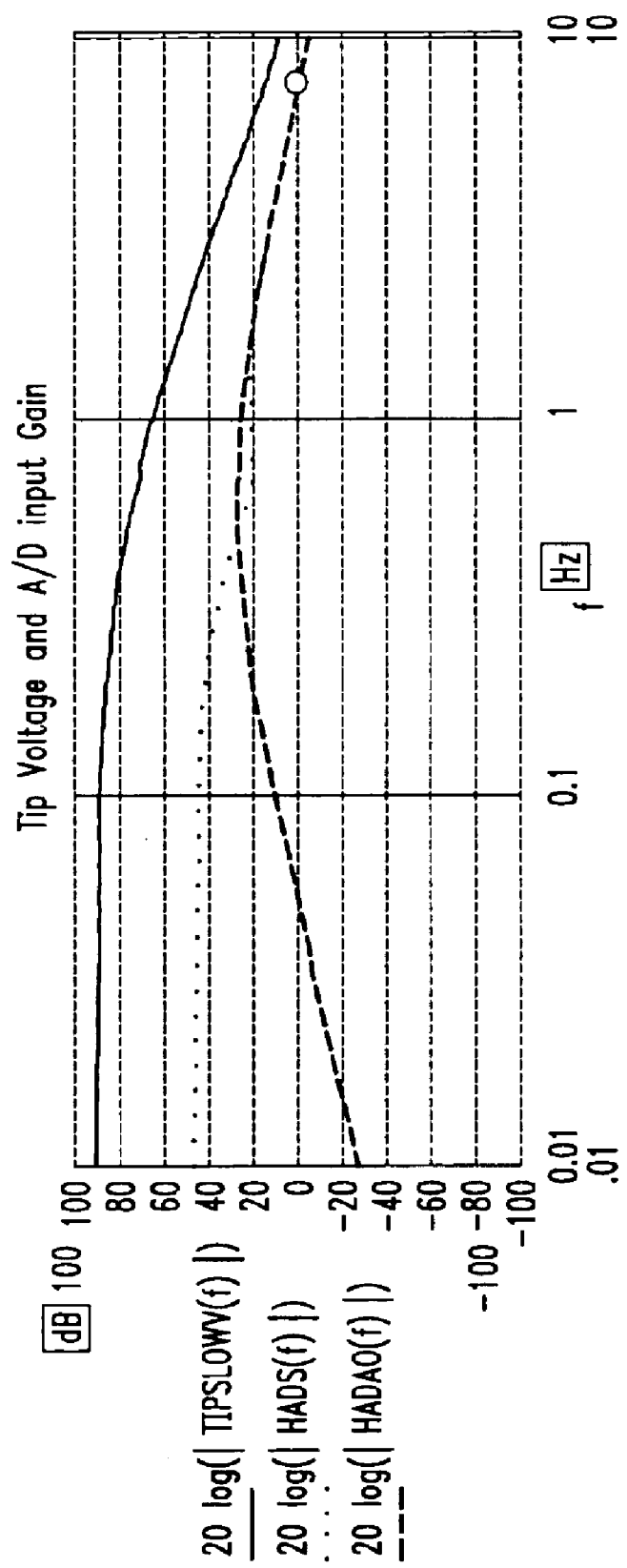
FIGS. 13A and 13B show the phase margin for a TAS termination with a low pass filter cutoff frequency set to 1 Hz when a delay is added (e.g., a 25 mS delay), simulating a worst case soft modem delay.
Figure 13B:
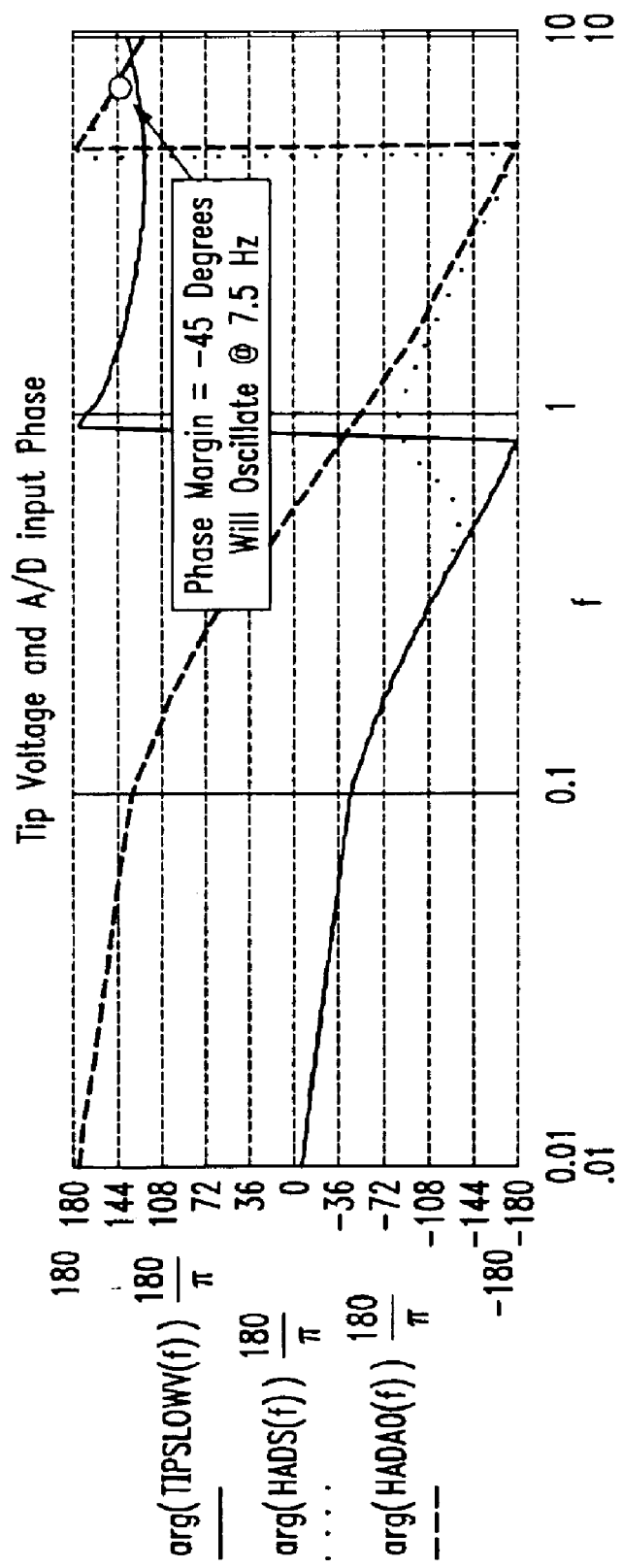

In contrast, FIGS. 13A and 13B show the phase margin for a TAS termination with a low pass filter cutoff frequency set to 1 Hz when a delay is added (e.g., a 25 mS delay), simulating a worst case soft modem delay. Note that the TAS termination under these conditions will be unstable and will oscillate, as shown in FIGS. 13A and 13B.

Figure 14A:
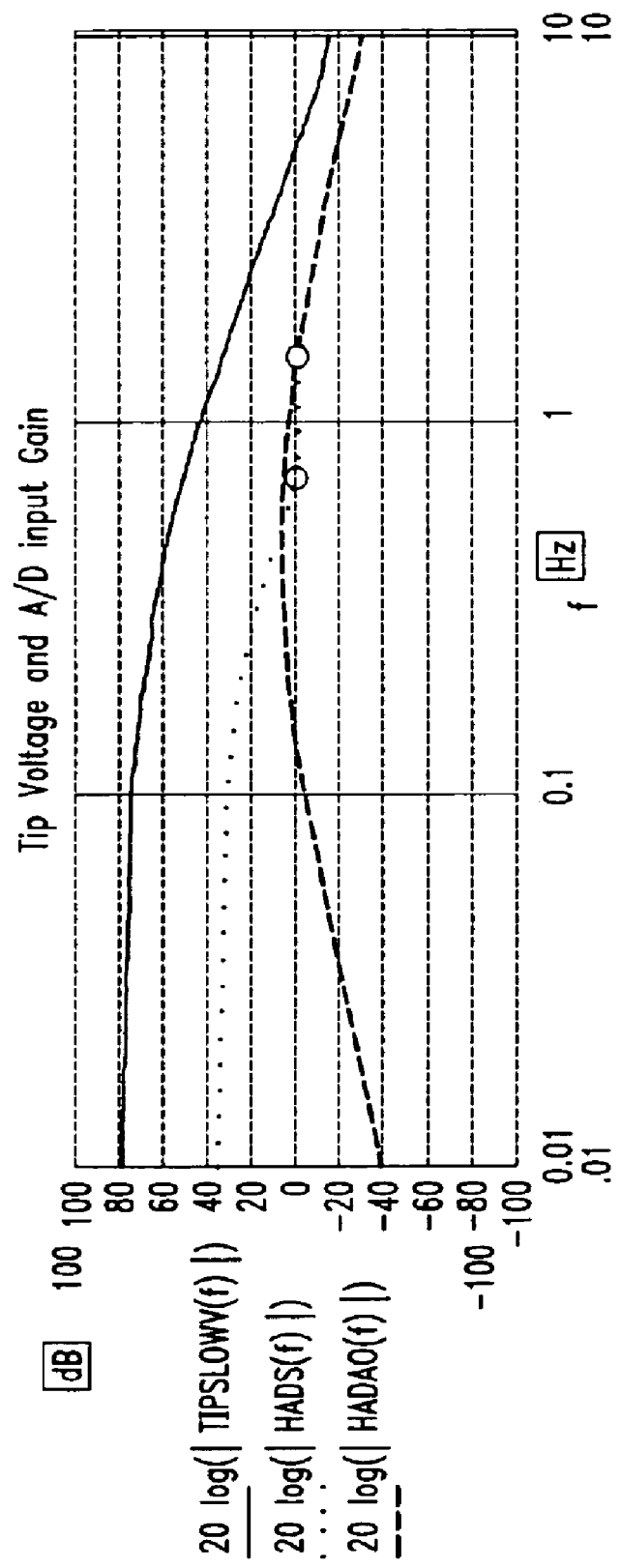
FIGS. 14A and 14B show that when the low pass filter cutoff frequency is changed to a lower cutoff level, e.g., to 0.1 Hz, the system becomes stable and does not oscillate significantly.
Figure 14B:
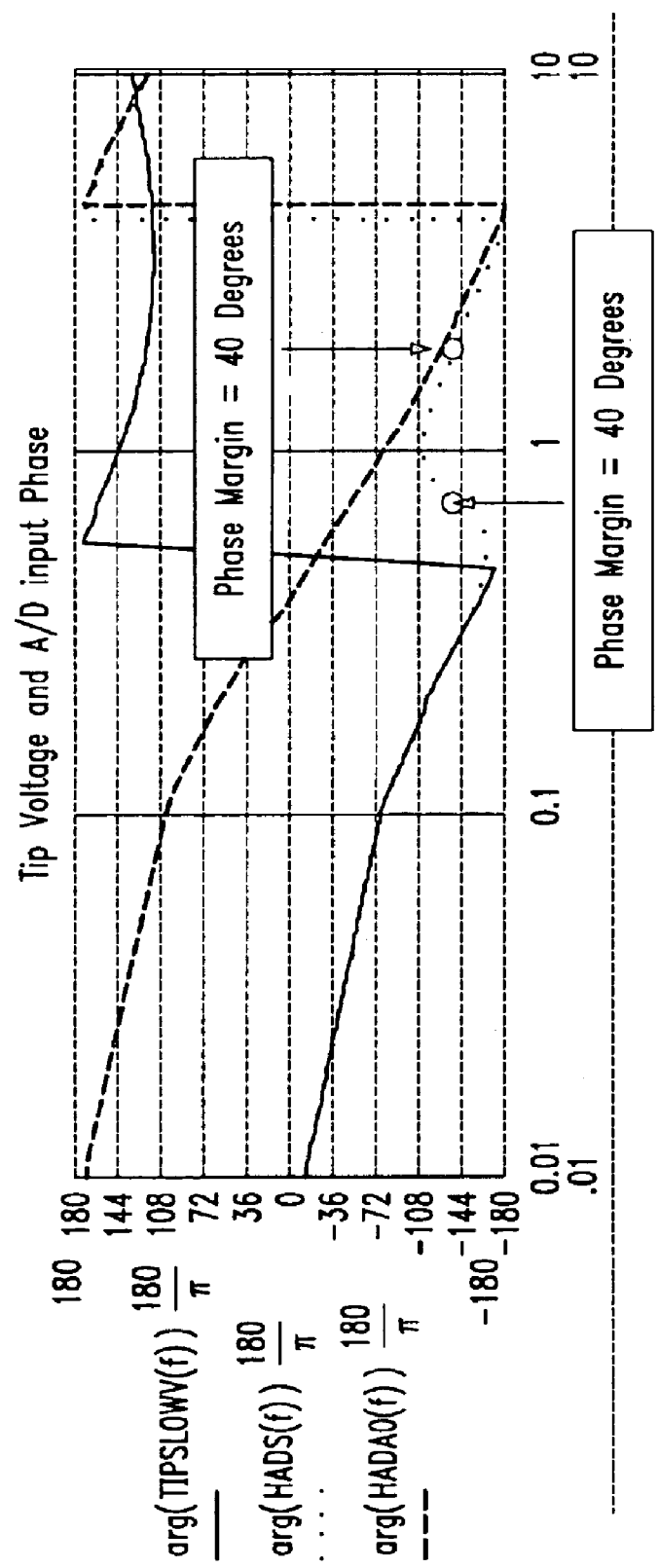
Figure 15:
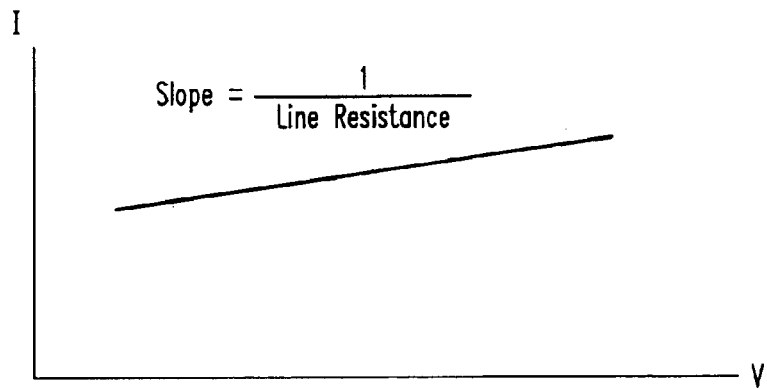
FIG. 15 shows an example of a current-versus-voltage load-line requirement to keep a telephone line in an off-hook condition.
Figure 16:
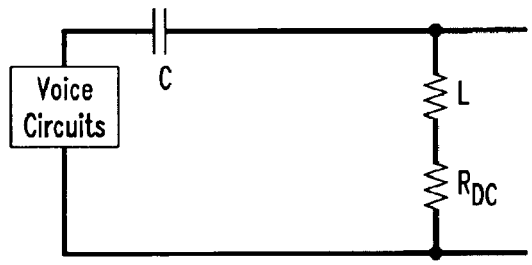
FIG. 16 shows a conventional circuit for setting DC line current.
Figure 17:
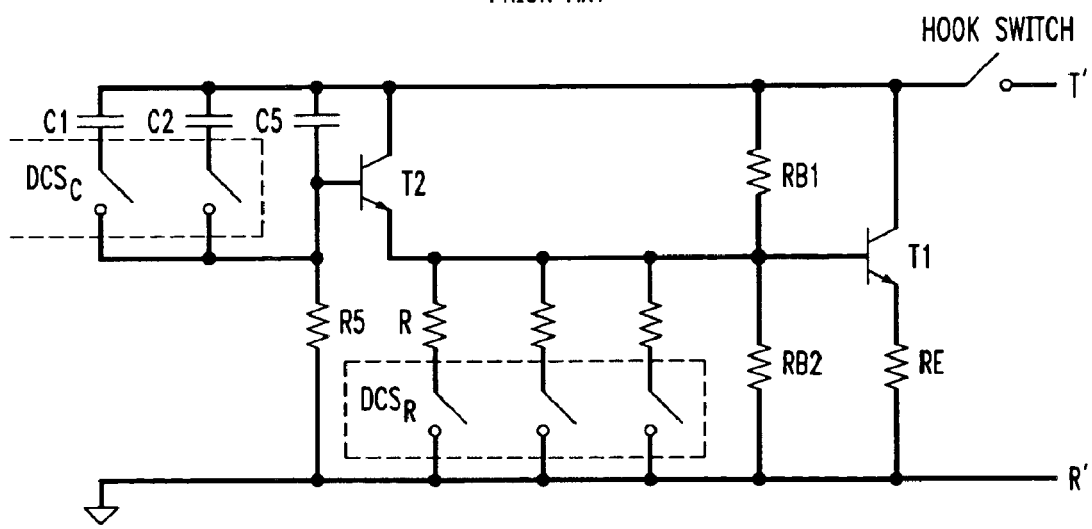
FIG. 17 shows a conventional gyrator circuit.

However, as shown in FIGS. 14A and 14B, the low pass filter cutoff frequency is changed to a lower cutoff level, e.g., to 0.1 Hz, the system becomes stable and will not oscillate significantly.

However, while a real telephone line may be stable under both cutoff frequency conditions because the open loop gain is small relative to that of a PBX or TAS, a PBX termination (or other type of termination) may result in opposite results.

Since the line termination is not known before going off-hook, the solution is to go off-hook with the telephone line interface 16 with a first cutoff frequency programmed into the digital filter 22 (e.g., with a cutoff frequency of 1 Hz), and then to check the output of the digital low pass filter 22 for an oscillation (or at least for an oscillation above a predetermined threshold level).

If an oscillation is detected, the low pass filter cutoff frequency is trimmed in accordance with the principles of the present invention. For example, FIGS. 14A and 14B show that when the low pass filter cutoff frequency is changed to a lower cutoff level, e.g., to 0.1 Hz, the system becomes stable and does not oscillate significantly. Thus, as shown in FIGS. 14A and 14B, the digital filter cutoff frequency can be changed to a cutoff frequency of 0.1 Hz, allowing the system to stabilize and converge more rapidly. For instance, in the given example, the system will stabilize and converge in less than 1 second (e.g., before dialing begins).

While the invention has been described with reference to the exemplary preferred embodiments thereof, those skilled in the art will be able to make various modifications to the described embodiments of the invention without departing from the true spirit and scope of the invention.

What is claimed is:

1. A digital gyrator, comprising:
    a digital filter to emulate an inductance on a telephone line serviced by said digital filter, said digital filter being initially settable to a first cutoff frequency; and
    an oscillation checker module to detect an amplitude of oscillation on said telephone line serviced by said digital filter, said oscillation checker module adapted to reset said digital filter to a second cutoff frequency lower than said first cutoff frequency as a function of said detected oscillation level;
    wherein said gyrator resets said digital filter to a third cutoff frequency after a predetermined period of time after said digital gyrator causes telephone equipment to enter an off-hook condition.

2. The digital gyrator according to claim 1, wherein:
    said first cutoff frequency is significantly faster than said third cutoff frequency.

3. The digital gyrator according to claim 1, wherein:
    said predetermined period of time is at least one second.

4. The digital gyrator according to claim 1, wherein:
    said first cutoff frequency relates to a desired convergence rate when said telephone line is in a pre-charge state.

5. The digital gyrator according to claim 4, wherein:
    said third cutoff frequency relates to a desired convergence rate after said telephone line is in a steady state.

6. The digital gyrator according to claim 1, wherein:
    said third cutoff frequency relates to a desired convergence rate after said telephone line is in a steady state.

7. The digital gyrator according to claim 1, further comprising:
    a digital load line correlation table to correlate values output from said digital filter into a desired voltage level.

8. The digital gyrator according to claim 7, further comprising:
    a codec to convert an output from said digital load line correlation table into a voltage signal for output to a DAA servicing said telephone line.

9. A method of regulating a signal on a telephone line, comprising:
    digitizing a signal received from said telephone line;
    filtering said digitized signal with a digital low pass filter having a first cutoff frequency;
    detecting an amplitude of oscillation in said signal at said telephone line;
    adjusting said digital low pass filter to have a second cutoff frequency lower than said first cutoff frequency to dampen said detected oscillation if an amplitude of said oscillation indicates an unstable pre-charge state of said telephone; and
    after a pre-charge period of said telephone line, adjusting said digital low pass filter to have a third cutoff frequency relating to a steady state of said telephone line.

10. The method of regulating a signal on said telephone line according to claim 9, wherein:
    said first cutoff frequency is approximately 1 Hz.

11. The method of regulating a signal on said telephone line according to claim 10, wherein:
    said second cutoff frequency is approximately 0.1 Hz.

12. The method of regulating a signal on said telephone line according to claim 9, wherein:
    said second cutoff frequency is approximately 0.1 Hz.

13. Apparatus for regulating a signal on a telephone line, comprising:

means for digitizing a signal received from said telephone line;

means for filtering said digitized signal with a digital low pass filter having a first cutoff frequency;

means for detecting an amplitude of oscillation in said signal on said telephone line;

means for adjusting said digital low pass filter to have a second cutoff frequency lower than said first cutoff frequency to dampen said detected oscillation if an amplitude of said oscillation indicates an unstable pre-charge state of said telephone; and means for adjusting said digital low pass filter after a pre-charge period of said telephone line, to have a third cutoff frequency relating to a steady state of said telephone line.

14. The apparatus for regulating a signal on said telephone line according to claim 13, wherein:

said first cutoff frequency is approximately 1 Hz.

15. The apparatus for regulating a signal on said telephone line according to claim 14, wherein:

said second cutoff frequency is approximately 0.1 Hz.

16. The apparatus for regulating a signal on said telephone line according to claim 13, wherein:

said second cutoff frequency is approximately 0.1 Hz.

17. An integrated circuit including a digital gyrator, comprising:

a digital filter to service a telephone line, said digital filter being initially settable to a first cutoff frequency; and an oscillation checker module to detect a presence of undesirable oscillation on said telephone line serviced by said digital filter, said oscillation checker module adapted to reset said digital filter to a second cutoff frequency lower than said first cutoff frequency if said undesirable oscillation is present;

wherein said digital gyrator resets said digital filter to a third cutoff frequency associated with a steady state of said telephone line after a predetermined period of time after said digital gyrator causes telephone equipment to enter an off-hook condition.

18. The integrated circuit including a digital gyrator according to claim 17, wherein:

said first cutoff frequency is significantly faster than said third cutoff frequency.

19. The integrated circuit including a digital gyrator according to claim 17, wherein:

said predetermined period of time is at least one second.

20. The integrated circuit including a digital gyrator according to claim 17, wherein:

said first cutoff frequency relates to a desired convergence rate when said telephone line is in a pre-charge state.

21. The integrated circuit including a digital gyrator according to claim 17, further comprising:

a digital load line correlation table to correlate values output from said digital filter into a desired voltage level.

22. The integrated circuit including a digital gyrator according to claim 17, further comprising:

a codec to convert an output from said digital load line correlation table into a voltage signal for output to a DAA servicing said telephone line.

* * * * *